United States Patent
Kimura et al.

(10) Patent No.: US 8,442,446 B2
(45) Date of Patent: May 14, 2013

(54) RADIO COMMUNICATION DEVICE

(75) Inventors: Masahiko Kimura, Mizuho (JP);
Masaaki Wakizaka, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1140 days.

(21) Appl. No.: 12/363,745

(22) Filed: Jan. 31, 2009

(65) Prior Publication Data

US 2009/0195827 A1 Aug. 6, 2009

(30) Foreign Application Priority Data

Feb. 1, 2008 (JP) .............................. 2008-022894

(51) Int. Cl.
*H04B 17/00* (2006.01)

(52) U.S. Cl.
USPC ............ 455/67.11; 455/501; 455/39; 455/73; 455/226.1

(58) Field of Classification Search .................... 455/39, 455/41.2, 500, 501, 514, 63.1, 73, 130, 296, 455/67.11, 226.1
See application file for complete search history.

(56) References Cited

U.S. PATENT DOCUMENTS

| 7,006,451 B2 | 2/2006 | Kuwahara |
| 7,016,395 B2 | 3/2006 | Watanabe et al. |
| 2002/0080739 A1 | 6/2002 | Kuwahara |
| 2002/0191678 A1* | 12/2002 | Batra et al. ................. 375/132 |
| 2007/0183338 A1* | 8/2007 | Singh et al. ................. 370/252 |

FOREIGN PATENT DOCUMENTS

| JP | 2001-186211 A | 7/2001 |
| JP | 2002-198867 A | 7/2002 |
| JP | 2002-198868 A | 7/2002 |

* cited by examiner

*Primary Examiner* — Tuan Pham
(74) *Attorney, Agent, or Firm* — Baker Botts L.L.P.

(57) ABSTRACT

A radio communication device and multifunction device are provided. The radio communication device includes a radio communicating unit which receives data according to a radio communication method using one of a plurality of radio channels provided in a frequency band and changes the radio channel according to a period; a data processing unit which performs processing using the data; a communication status determining unit which determines, for each channel, whether a communication status of the radio channel is good; a ratio changing unit which changes a ratio of setting a good channel whose communication status is determined as good, and a ratio of setting a not-good channel whose communication status is determined as not-good; and a setting unit which sets either the good channel or the not-good channel as the radio channel in the radio communication method according to the ratios changed by the ratio changing unit.

10 Claims, 9 Drawing Sheets

FIG. 2

| WIRELESS LAN CHANNEL | BT CHANNEL | | | |
|---|---|---|---|---|
| | 12a1 | | 12a2 | |
| wch1 | bch 1 | bch 2 | ... | bch 22 |
| wch2 | bch 5 | bch 6 | ... | bch 26 |
| ⋮ | ⋮ | ⋮ | ⋮ | ⋮ |
| wch14 | bch 57 | bch 58 | ... | bch 79 |

FIG. 3A

FIRST BT CHANNEL MEMORY (BT GOOD CHANNEL HP TABLE)

| HP ORDER | 1 | 2 | 3 | 4 | 5 | 6 | 7 | 8 | 9 | 10 | ... | 30 |
|---|---|---|---|---|---|---|---|---|---|---|---|---|
| HP CHANNEL | bch 1 | bch 3 | bch 4 | bch 2 | bch 5 | bch 13 | bch 14 | bch 8 | bch 19 | bch 16 | ... | bch 20 |

FIG. 3B

SECOND BT CHANNEL MEMORY (BT NOT-GOOD CHANNEL HP TABLE)

| HP ORDER | 1 | 2 | 3 | 4 | 5 | 6 | 7 | 8 | 9 | 10 | ... | 59 |
|---|---|---|---|---|---|---|---|---|---|---|---|---|
| HP CHANNEL | bch 21 | bch 24 | bch 25 | bch 42 | bch 41 | bch 32 | bch 45 | bch 33 | bch 29 | bch 38 | ... | bch 40 |

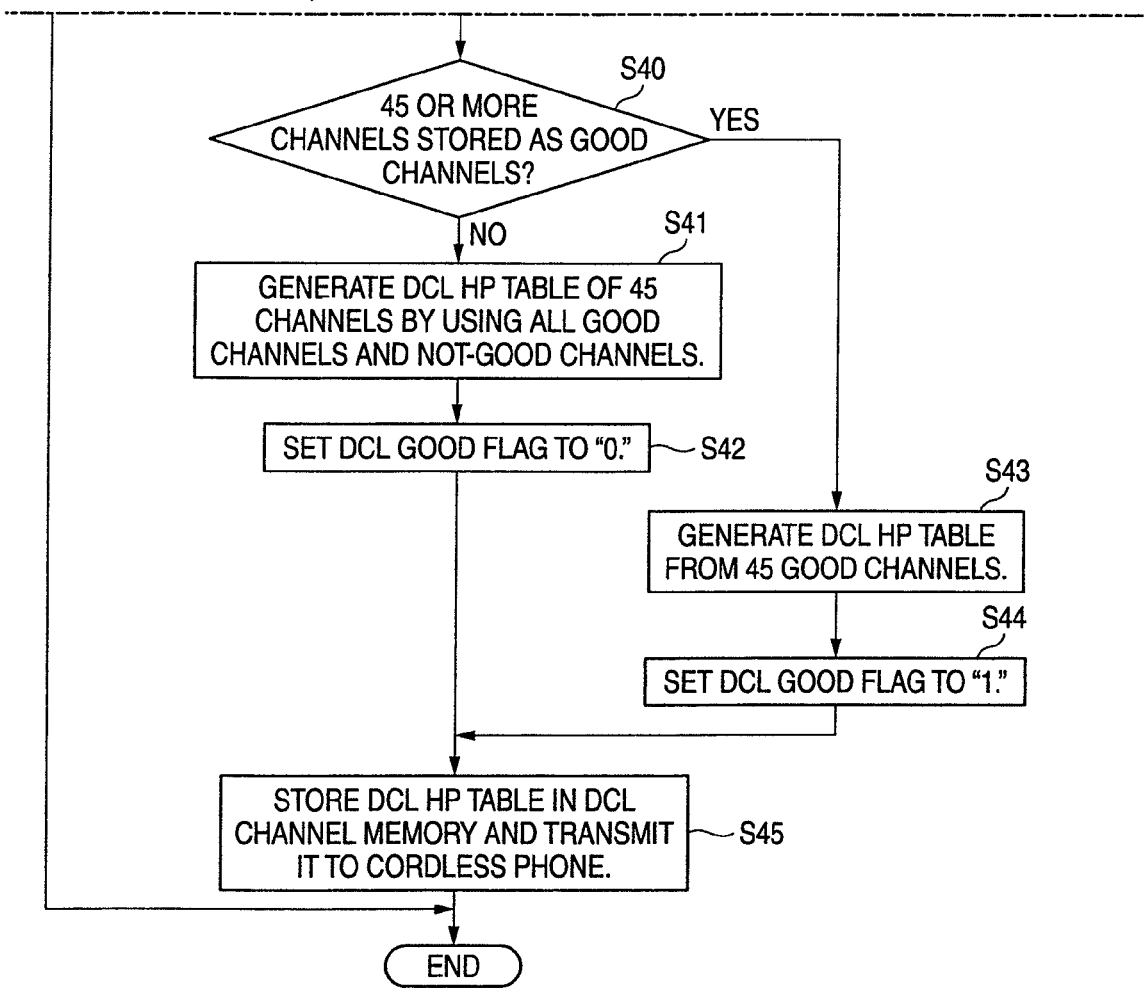

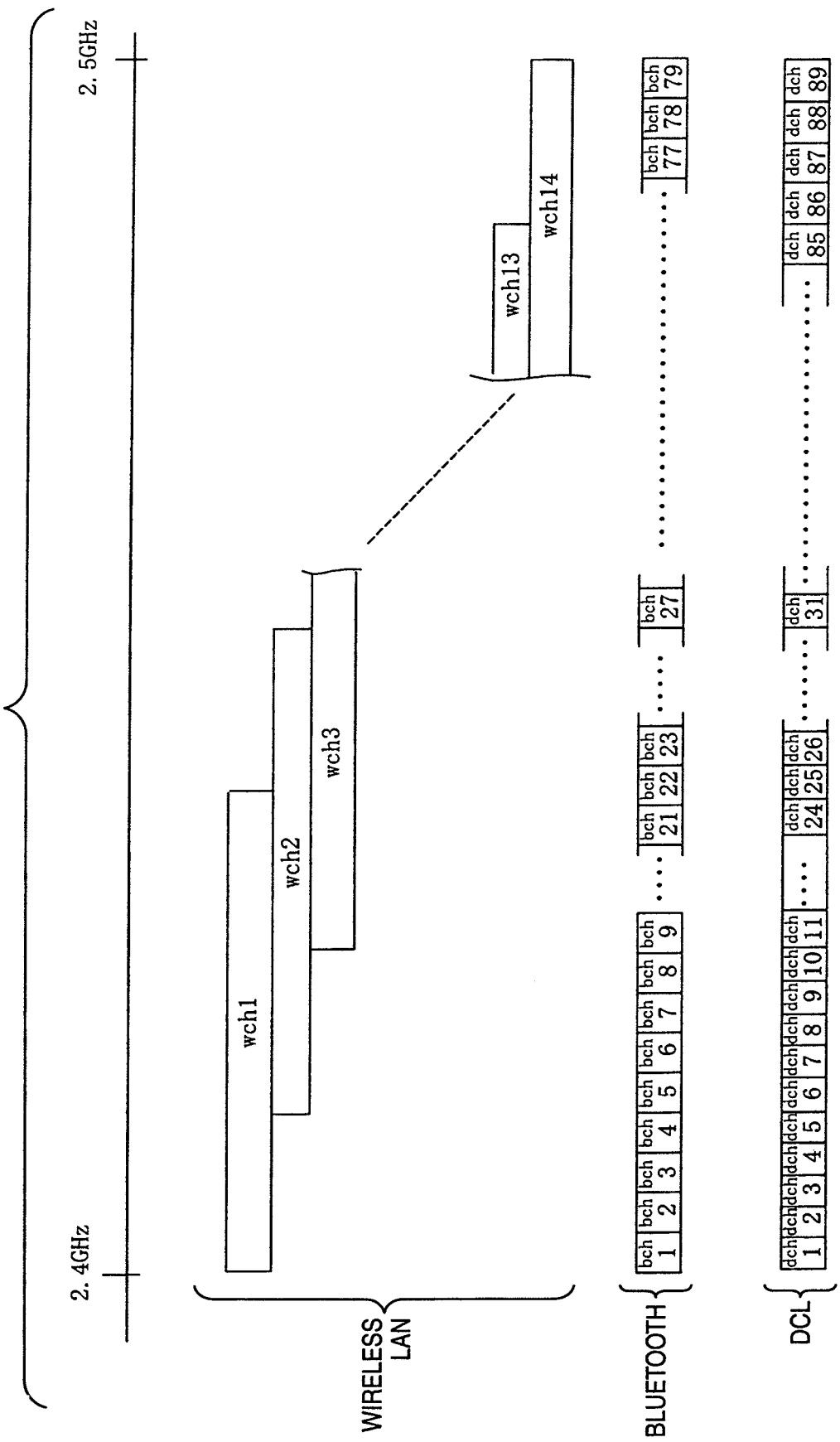

RADIO COMMUNICATION DEVICE

CROSS-REFERENCE TO RELATED APPLICATIONS

The application claims priority from Japanese Patent Application No. 2008-022894 filed on Feb. 1, 2008, the entire contents of which are incorporated herein by reference.

TECHNICAL FIELD

Devices and apparatuses consistent with the present invention relate to radio communication devices which can reduce the influence of interference.

DESCRIPTION OF THE RELATED ART

A related art communication device which makes data communication and a call via radio communication is known. In such a related art communication device, frequency bands to be used for radio communications overlap each other in some cases although the communication methods of the radio communications to be used for data communication and a call are different. For example, a wireless Local Area Network (LAN) or a Bluetooth device (registered trademark) (hereinafter, referred to as "BT") both of which are for data communication, etc., or a digital cordless telephone (hereinafter, referred to as "DCL") for voice communication may use a same frequency band of 2.4 GHz. For each communication method, the frequency band is divided into a plurality of channels. To distinguish the channels in the respective communication methods, hereinafter, channels to be used by the wireless LAN are referred to as wireless LAN channels, and channels to be used by BT are referred to as BT channels, and channels to be used by DCL are referred to as DCL channels.

In a situation in which two or more communication methods as described above are mixed, the same frequency band is used by the respective communication methods, so that radio wave interference may occur between the respective communication methods.

JP-A-2002-198868 describes a related art technique for preventing radio wave interference by detecting the presence of carriers (i.e., radio waves which carry signals) of a wireless LAN using Bluetooth and preventing a radio channel in which the presence of the carriers is detected from being used for Bluetooth communication.

However, in the related art technique described above, Bluetooth communication is prevented from using the communication channels in which presence of carriers are detected for the wireless LAN, so that the number of communication channels available for Bluetooth communication is limited. Therefore, in an environment in which many carriers are detected, there is a disadvantage in that a number of communication channels for use for Bluetooth communication becomes limited.

SUMMARY

It is an aspect of the present invention to provide a radio communication system which can reduce an influence of radio wave interference even in an environment involving channels which cause radio wave interference.

According to an illustrative aspect of the present invention, there is provided a radio communication device comprising a first radio communicating unit which receives data according to a first radio communication method which uses one of a plurality of first radio channels provided in a frequency band and changes the first radio channel to be used with a first period; a data processing unit which performs processing using data received by the first radio communicating unit; a first communication status determining unit which determines, for each first radio channel, whether a communication status of the radio channel is good; a ratio changing unit which changes a ratio of setting, as the first radio channel to be used in the first radio communication method, a good channel whose communication status is determined as good by the first communication status determining unit, and a ratio of setting a not-good channel whose communication status is determined as not-good, according to a data receiving status of the first radio communicating unit and a processing status of the processing in the data processing unit; and a setting unit which sets either the good channel or the not-good channel as the first radio channel to be used in the first radio communication method according to the ratios changed by the ratio changing unit.

According to another illustrative aspect of the present invention, there is provided a multifunction device comprising a communication control circuit which transmits and receives data by frequency hopping using a plurality of communication channels in a frequency band; a memory which stores a good channel table, which includes a list of communication channels of the plurality of communication channels which are not experiencing interference, and a not-good channel table, which includes a list of communication channels of the plurality of communication channels which are experiencing interference; and a controller. The controller is configured to generate the good channel table and the not-good channel table, based on a determination, for each of the plurality of communication channels, whether the communication channel is experiencing interference; set a channel ratio of a number of good channels to be used in communication to a number of not-good channels to be used in communication; and control the communication control circuit to communicate data by frequency hopping using the plurality of communication channels according to the channel ratio.

BRIEF DESCRIPTION OF THE DRAWINGS

FIG. 2 is a schematic view schematically showing an example of contents of a channel correspondence table;

FIG. 3A is a schematic view schematically showing an example of contents of a BT good channel hopping (HP) table, and FIG. 3B is a schematic view schematically showing an example of contents of a BT not-good channel HP table;

FIG. 9 is a diagrammatic view showing an example of a frequency band and frequency channels used by a wireless LAN, Bluetooth, and DCL.

DESCRIPTION OF EXEMPLARY EMBODIMENTS OF THE PRESENT INVENTION

Figure 1:
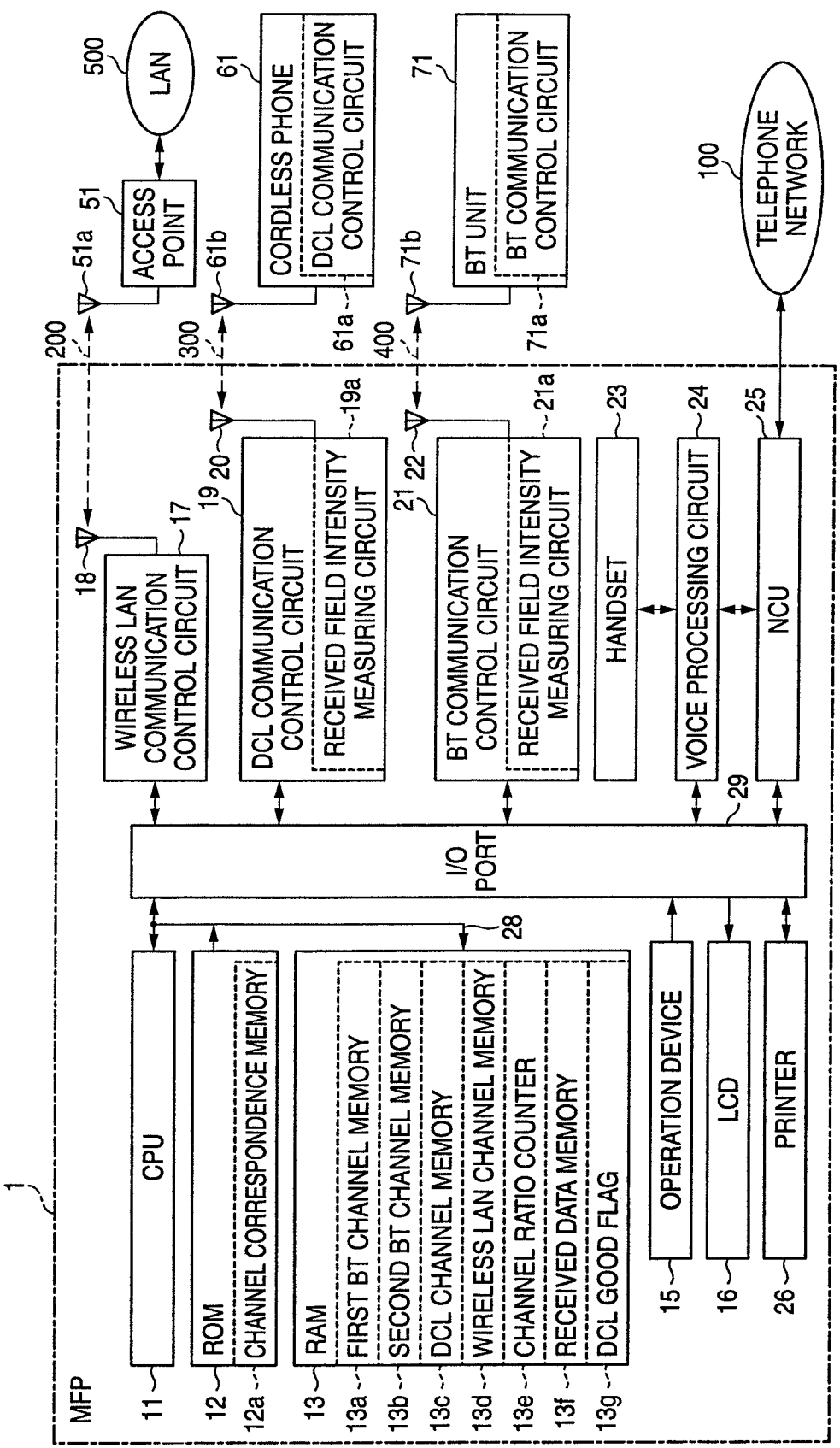
FIG. 1 is a view showing an electrical configuration of a radio communication system including a multifunction peripheral according to a first exemplary embodiment of the present invention.

Hereinafter, exemplary embodiments of the present invention will be described with reference to the accompanying drawings. FIG. 1 is a block diagram showing an electrical configuration of a radio communication system including a multifunction peripheral (hereinafter, referred to as "MFP") 1 according to a first exemplary embodiment of the present invention.

First Exemplary Embodiment

In this radio communication system, the MFP 1 is a multifunction peripheral having a wireless LAN function for making radio communication 200 with an access point 51 and accessing a Local Area Network (LAN) 500 coupled to the access point 51, a digital cordless phone (DCL) function for making a call while making radio communication 300 between the MFP 1 (main phone) and a digital cordless phone (hereinafter, referred to as "cordless phone") 61, a Bluetooth (BT) function for making data communication while making radio communication 400 between the MFP 1 and the Bluetooth unit (hereinafter, referred to as "BT unit") 71, a fixed-line telephone function for making a call with an external telephone 3 via a telephone network 100, and a printing function for printing images corresponding to image data.

Any of the radio communication 200 using the wireless LAN, the radio communication 300 using the DCL, and the radio communication 400 using BT are made by using a 2.4 GHz frequency band (e.g., 2.4 GHz to 2.5 GHz) (see FIG. 9). The radio communication 200 using the wireless LAN is made according to a direct diffusion method by using one of 14 wireless LAN channels (e.g., wch 1 to wch 14) obtained by dividing the 2.4 GHz band.

The radio communication 300 using DCL is made according to a frequency hopping method in which the 2.4 GHz band is divided into 89 DCL channels (e.g., dch 1 to dch 89) and hopping is performed among 45 of the DCL channels with a given period (e.g., a hopping period of ¹/₁₀₀ seconds). The given period may be predetermined.

Further, in the radio communication 400 using BT, the 2.4 GHz band is divided into 79 BT channels (e.g., bch 1 to bch 79). Then, the radio communication 400 using BT is made according to a frequency hopping method in which the 79 BT channels are hopped in each hopping period (¹/₁₆₀₀ seconds). The BT hopping period is typically different that the DCL hopping period.

Thus, the radio communications 200, 300, and 400 use the same frequency band, so that if the radio communications 200, 300, and 400 simultaneously use the band, radio waves interfere with each other in the channels, and normal radio communications may not be able to be made. The MFP 1 of the first exemplary embodiment is configured so that, particularly for the radio communication 400 using BT, even in an environment involving many BT channels which cause radio wave interference, radio communication 400 can be normally made by reducing the influence of the radio wave interference.

[Multifunction Peripheral]

Next, an electrical configuration of the MFP 1 will be described. The MFP 1 includes, as shown in FIG. 1, a Central Processing Unit (CPU) 11, a Read Only Memory (ROM) 12, a Random Access Memory (RAM) 13, an operation device 15, a liquid crystal display (hereinafter, referred to as an "LCD") 16, a wireless LAN communication control circuit 17, a digital cordless communication control circuit (hereinafter, referred to as "DCL communication control circuit") 19, a Bluetooth communication control device (hereinafter, referred to as "BT communication control circuit") 21, a handset 23, a voice processing circuit 24, a Network Control Unit (NCU) 25, and a printer 26.

The CPU 11, the ROM 12, and the RAM 13 are coupled to each other via a bus line 28. The handset 23 and the NCU 25 are coupled to the voice processing circuit 24. Further, the operation device 15, the LCD 16, the wireless LAN communication control circuit 17, the DCL communication control circuit 19, the BT communication control circuit 21, the voice processing circuit 24, the NCU 25, the printer 26, and the bus line 28 are coupled to each other via an input/output (I/O) port 29.

The CPU 11 is an arithmetic unit which controls respective functions of the MFP 1 and respective parts coupled to the I/O port 29 according to fixed values and programs stored in the ROM 12 and RAM 13 or various signals transmitted and received via the wireless LAN communication control circuit 17, the DCL communication control circuit 19, the BT communication control circuit 21, or the NCU 25.

The ROM 12 is a rewritable nonvolatile memory storing control programs, etc., to be executed in the MFP 1. Respective programs for executing BT hopping table generation processing (hereinafter, referred to as "BT HP table generation processing") shown in the flowchart of FIG. 4, the DCL hopping table generation processing (hereinafter, referred to as "DCL HP table generation processing") shown in the flowchart of FIG. 5, and the BT communication processing shown in the flowchart of FIG. 6 are stored in the ROM 12.

The ROM 12 is provided with a wireless LAN channel-BT channel correspondence memory 12a (hereinafter, referred to as "channel correspondence memory 12a"). The channel correspondence memory 12a stores a wireless LAN channel-BT channel correspondence table (hereinafter, referred to as "channel correspondence table").

The channel correspondence table will be described with reference to FIG. 2. FIG. 2 is a schematic view schematically showing contents of the channel correspondence table. The channel correspondence table shows BT channels 12a2 and wireless LAN channels 12a1. The channel correspondence table shows BT channels 12a2 whose frequency bands overlap the frequency band of corresponding wireless LAN channels 12a1. The wireless LAN channels 12a1 are divided into 14 wireless LAN channels (e.g., wch 1 to wch 14) provided in the 2.4 GHz band.

In the BT channels 12a2, all BT channels whose frequency bands overlap the frequency bands of corresponding wireless LAN channels are made correspondent to the wireless LAN channels 12a1. For example, to the wireless LAN channel "wch 1," the BT channels "bch 1, bch 2, . . . , bch 22" are made correspondent, and to the wireless LAN channel "wch 2," BT channels "bch 5, bch 6, . . . , bch 26" are made correspondent. To the wireless LAN channel "wch 14," BT channels "bch 57, bch 58, . . . , bch 79" are made correspondent. In other words, the BT channels bch 1, bch 2, bch 22, etc. correspond to the wireless LAN channel wch 1, and so on.

The channel correspondence table is referred to in the BT HP table generation processing (see FIG. 4) described later. When executing the BT HP table generation processing, while making the radio communication 200 using the wireless LAN in the MFP 1, the CPU 11 refers to the channel correspondence table stored in the channel correspondence memory 12a and identifies BT channels corresponding to the wireless LAN channel being used by the radio communication 200 using the wireless LAN. The BT channels identified in the channel correspondence table are used by the radio communication 200 using the wireless LAN, so that the identified BT channels are determined to be channels whose communication statuses are not-good.

The ROM 12 also stores another channel correspondence table for making correspondence between the wireless LAN channels and DCL channels. The table shows DCL channels whose frequency bands overlap the frequency bands of the 14 wireless LAN channels respectively, and is referred to in the DCL HP table generation processing (see FIG. 5) described later.

In other words, when executing the DCL HP table generation processing, while making radio communication 200 using the wireless LAN in the MFP 1, the CPU 11 refers to the table and identifies DCL channels corresponding to a wireless LAN channel being used by the radio communication 200. Then, the DCL channels identified are used by the radio communication 200 using the wireless LAN, so that the channels are determined to be channels whose communication statuses are not-good.

Returning to FIG. 1, the RAM 13 is a rewritable volatile memory for temporarily storing various data when executing respective operations of the MFP 1. The RAM 13 is provided with a first BT channel memory 13a, a second BT channel memory 13b, a DCL channel memory 13c, a wireless LAN channel memory 13d, a channel ratio counter 13e, a received data memory 13f, and a DCL good flag 13g.

The first BT channel memory 13a is a memory for storing a BT hopping table generated from a plurality of BT channels whose communication statuses are determined to be good (hereinafter, referred to as "BT good channel HP table"). The second BT channel memory 13b is a memory for storing a BT hopping table generated from a plurality of BT channels whose communication statuses are determined to be not-good (hereinafter, referred to as "BT not-good channel HP table").

The BT hopping table (hereinafter, referred to as "BT HP table") is a table for determining the order of hopping of the BT channels to be used in the radio communication 400 using BT. In the first exemplary embodiment, two tables, i.e., a BT good channel HP table and a BT not-good channel HP table, are prepared as the BT HP table.

When the CPU 11 sets the radio communication 400 using BT so that the radio communication is made by using a BT channel whose communication status is determined to be good (hereinafter, referred to as "good channel"), hopping is performed in the order determined in the BT good channel HP table. When the CPU 11 sets the radio communication 400 using BT so that the radio communication 400 using BT is made by using a BT channel whose communication status is determined to be not-good (hereinafter, referred to as "not-good channel"), hopping is performed in the order determined in the BT not-good channel HP table.

The CPU 11 sets a ratio of setting a good channel (and a ratio of setting a not-good channel) as the BT channel to be used in the radio communication 400 according to the receiving speed of the radio communication 400 and the processing speed of the printing processing of the image data received through the radio communication 400 by the printer 26. According to the ratio, the CPU 11 determines which of either a good channel or a not-good channel is used as the BT channel to be used in the radio communication 400.

With reference to FIG. 3A and FIG. 3B, contents of the BT good channel HP table and the BT not-good channel HP table are described. FIG. 3A is a schematic view schematically showing an example of contents of the BT good channel HP table stored in the first BT channel memory 13a, and FIG. 3B is a schematic view schematically showing an example of contents of the BT not-good channel HP table stored in the second BT channel memory 13b.

As shown in FIG. 3A, in the BT good channel HP table, the hopping channels (hereinafter, referred to as "HP channels") 13a2 are made correspondent to the hopping order (hereinafter, referred to as "HP order") 13a1. Good channels are assigned randomly to the HP channels 13a1.

The HP order 13a1 indicates the order of BT channels to be hopped, and is shown by numbers of the order. In other words, as the HP order 13a1, numbers from "1" to the number of BT channels whose communication statuses are determined to be good ("30" in the example of FIG. 3A) are assigned in order.

In the HP channel 13a2, good channels are made correspondent to the HP order 13a1. In other words, in the example of FIG. 3A, the HP channel 13a2 "bch 1" is made correspondent to "1" of the HP order 13a1, the HP channel 13a2 "bch 3" is made correspondent to "2" of the HP order 13a1, and the HP channel 13a2 "bch 4" is made correspondent to "3" of the HP order 13a1. The HP channel 13a2 "bch 20" is made correspondent to "30" of the HP order 13a1.

During execution of the BT communication processing (see FIG. 6) described later, when it is determined that the radio communication 400 is made by using a good channel in the next hopping period, as a BT channel to be used in the hopping period, the CPU 11 selects a BT channel shown in the HP channel 13a2 according to the order shown in the HP order 13a1 in the BT good channel HP table. In other words, according to the BT good channel HP table of FIG. 3A, the channels are hopped in the order of "bch 1," "bch 3," "bch 4," "bch 2", "bch 5", "bch 13," . . . "bch 20," "bch 1," "bch 3," . . .

On the other hand, in the BT not-good channel HP table, as shown in FIG. 3B, HP channels 13b2 and subsequent channels are made correspondent to the HP order 13b1. Not-good channels are assigned randomly to the HP channels 13a1.

Similar to the HP order 13a1, the HP order 13b1 is shown by numbers of the order of BT channels to be hopped. In other words, to the HP order 12b1, numbers from "1" to the number ("59" in the example of FIG. 3B) of BT channels whose communication statuses are determined to be not-good are assigned in order.

In the HP channel 13b2, not-good channels are made correspondent to the HP order 13b1. In other words, in the example shown in FIG. 3B, the HP channel 13b2 "bch 21" is made correspondent to "1" of the HP order 13b1, the HP channel 13b2 "bch 24" is made correspondent to "2" of the HP order 13b1, and the HP channel 13b2 "bch 25" is made correspondent to "3" of the HP order 13b1. The HP channel 13b2 "bch 40" is made correspondent to "59" of the HP order 13b1.

During execution of the BT communication processing (see FIG. 6) described later, when it is determined that the radio communication 400 is made by using a not-good channel in the next hopping period, as a BT channel to be used in the hopping period, the CPU 11 selects a BT channel shown in the HP channel 13b2 according to the order shown in the HP order 13b1 in the BT not-good channel HP table. In other words, according to the BT not-good channel HP table of FIG. 3B, the channels are hopped in the order of "bch 21," "bch 24," "bch 25," "bch 42," . . . "bch 40," "bch 21," "bch 24" . . . .

In the first exemplary embodiment, after the BT good channel HP table is selected in one hopping period, when the BT not-good channel HP table is selected in the next hopping period and the BT good channel HP table is selected again in a further subsequent hopping period, control is performed so that the HP channel 13a2 is selected from the order in the HP order 13b1 subsequent to the channel previously selected from the BT good channel HP table.

After the BT not-good channel HP table is selected in one hopping period, in the next hopping period, the BT good channel HP table is selected, and in a further subsequent hopping period, when the BT not-good channel HP table is selected again, control is performed so that the HP channel 13b1 is selected from the order in the HP order 13b2 subsequent to the channel previously selected from the BT not-good channel HP table.

The BT good channel HP table and the BT not-good channel HP table are generated and updated by executing the BT HP table generation processing (see FIG. 4) described later at intervals of time (e.g., at intervals of 10 minutes in the first exemplary embodiment) by the CPU 11. The intervals may be predetermined. The updated BT good channel HP table and BT not-good channel HP table are also transmitted to the BT unit 71 via the radio communications 400, respectively.

Returning to FIG. 1, the DCL channel memory 13c is a memory for storing a DCL hopping table (hereinafter, referred to as "DCL HP table") generated by using 45 DCL channels among the 89 DCL channels.

The DCL HP table is a table determining the order of hopping the DCL channels to be used in the radio communication 300 using DCL, and in the radio communication 300, hopping is performed according to the order determined in the DCL HP table.

The DCL HP table is generated and updated by executing the DCL HP table generation processing (see FIG. 5) described later at intervals of time (e.g., at intervals of 10 minutes in the first exemplary embodiment) by the CPU 11. The generated DCL HP table is also transmitted to the cordless phone 61 via the radio communication 300.

At this time, in the CPU 11, the DCL HP table is generated by preferentially using DCL channels whose communication statuses are determined to be good among the 89 DCL channels. Accordingly, the radio communication 300 using DCL can be made by using a DCL channel whose communication status is determined to be good as much as possible.

The wireless LAN channel memory 13d is a memory for storing channel numbers (wch 1 to wch 14) of the wireless LAN channels to be used for the radio communication 200 using a wireless LAN. The wireless LAN communication control circuit 17 described later can make the radio communication 200 using a wireless LAN with an access point 51 by using the wireless LAN channel stored in the wireless LAN channel memory 13d.

The contents of the wireless LAN channel memory 13d are set according to operations of the operation device 15. When a wireless LAN channel to be used is instructed from the access point 51 to the wireless LAN communication control circuit 17, the contents of the wireless LAN channel memory 13d are rewritten into the instructed wireless LAN channel by the wireless LAN communication control circuit 17.

The wireless LAN channel memory 13d is referred to during execution of the BT HP table generation processing (see FIG. 5) and the DCL HP table generation processing (see FIG. 6) described later in the CPU 11. The CPU 11 identifies BT channels or DCL channels whose frequency bands overlap the frequency band of the wireless LAN channel to be used in the radio communication 200 using a wireless LAN based on the contents of the wireless LAN channel memory 13d and the channel correspondence table stored in the channel correspondence memory 12a.

A channel ratio counter 13e is a counter for determining a ratio of setting a good channel (and a ratio of setting a not-good channel) as the BT channel to be used in the radio communication 400 using BT. In other words, when a value X is set in the channel ratio counter 13e, as the BT channel to be used in the radio communication 400, a good channel is set at a ratio of $1/(X+1)$, and a not-good channel is set at a ratio of $X/(X+1)$.

The channel ratio counter 13e is set according to the receiving speed of the radio communication 400 using BT and/or the processing speed of the printing processing of image data received through the radio communication 400 by the printing function of the MFP 1 in the BT communication processing (see FIG. 6) described later executed by the CPU 11.

In other words, when the receiving speed of the radio communication 400 is equal to or greater than a first threshold set according to the processing speed, the channel ratio counter 13e is set to "3." Therefore, as the BT channel to be used in the radio communication 400, a good channel is set at a ratio of 1/4, and a not-good channel is set at a ratio of 3/4.

When the receiving speed of the radio communication 400 is less than the first threshold set according to the processing speed, the channel ratio counter 13e is set to "1." Therefore, as the BT channel to be used in the radio communication 400, a good channel is set at a ratio of 1/2, and a not-good channel is set at a ratio of 1/2. In other words, in this case, a good channel and a not-good channel are set at the same ratio.

When the ratio of setting a good channel as the BT channel to be used in the radio communication 400 is set in the channel ratio counter 13e, the BT unit 71 is also notified of the ratio via the radio communication 400, and the ratio is set in a counter (not shown) provided in the BT unit 71.

Each time that hopping occurs between the MFP 1 and the BT unit 71, the counter values are independently counted down, and in the MFP 1 and the BT unit 71, respectively, based on the counter values, as the BT channel to be used in the radio communication 400, either a good channel or a not-good channel is set. Accordingly, BT channels to be hopped in the radio communication 400 can be synchronized between the MFP 1 and the BT 1.

A received data memory 13f is a memory for temporarily storing image data received through the radio communication 400 when an image print request is issued from the BT unit 71 to the MFP 1. The printer 26 reads image data stored in the received data memory 13f and prints an image corresponding to the image data.

The DCL good flag 13g is a flag for setting whether all 45 DCL channels used in the DCL HP table stored in the DCL channel memory 13c are good channels whose communication statuses are determined to be good, and when all 45 DCL channels are good channels, "1" is set, and when the DCL channels include a not-good channel, "0" is set.

The DCL good flag 13g is set to "0" as an initial value when a power supply (not shown) of the MFP 1 is turned on, and is set and updated according to the number of good channels used in the generation of the DCL HP table every time the DCL HP table is generated by executing the DCL HP table generation processing (see FIG. 5) by the CPU 11. The DCL HP table generation processing will be described in detail later.

The DCL good flag 13g is referred to in the BT communication processing (see FIG. 6) to be executed by the CPU 11, and according to the DCL good flag value, the channel to be used in the radio communication 400 using BT is controlled.

The operation device 15 is an input device for setting respective functions such as various radio communication functions using a wireless LAN, DCL, and BT, and the printing function, and instructing various operations. By operating the operation device 15, the contents of the wireless LAN channel memory 13d can be changed. The operation device 15 includes one or more keys or buttons to allow an input for instructing operations.

The LCD 16 is a display device for displaying a menu and an operation status according to operations on the operation device 15. When the operation device 15 is operated, information corresponding to the operation is displayed on the LCD 16.

The wireless LAN communication control circuit 17 has a wireless LAN antenna 18, and is a circuit that transmits and receives digital signals made up of various data while making the radio communication 200 according to a direction diffusion method with the access point 51 having a wireless LAN antenna 51a. The wireless LAN communication control circuit 17 makes the radio communication 200 with the access point 51 by using a wireless LAN channel stored in the wireless LAN channel memory 13d. When a wireless LAN channel is instructed from the access point 51, the wireless LAN channel is stored in the wireless LAN channel memory 13d, and the radio communication 200 with the access point 51 is made by using the wireless LAN channel.

The wireless LAN communication control circuit 17 also includes a function of notifying the CPU 11 of whether the radio communication 200 using a wireless LAN is being made. When the CPU 11 inquires to the wireless LAN communication control circuit 17 about the operation status of the wireless LAN communication control circuit 17, the wireless LAN communication control circuit 17 notifies the CPU 11 of whether the radio communication 200 using a wireless LAN is being made.

The DCL communication control circuit 19 has a DCL antenna 20, and is a circuit that transmits and receives digital signals (e.g., voice data) made up of a voice call while making the radio communication 300 according to a frequency hopping method with the DCL communication control circuit 61a of the cordless phone 61. The DCL communication control circuit 19 makes the radio communication 200 with the cordless phone 61 while hopping the DCL channels according to the DCL HP table stored in the DCL channel memory 13c in each hopping period (e.g., $1/100$ seconds).

The DCL communication control circuit 19 is provided with a received field intensity measuring circuit 19a. The received field intensity measuring circuit 19a is a circuit for measuring a received field intensity of an external radio wave received into a DCL channel (e.g., a determination channel) designated by the CPU 11 from the DCL antenna 20 when the radio communication 200 is not being made with the cordless phone 61.

When the CPU 11 designates the DCL channel (i.e., the determination channel) to the DCL communication control circuit 19 during execution of the DCL HP table generation processing (see FIG. 5) described later, the DCL communication control circuit 19 receives an external radio wave from the DCL antenna 20. Then, the received field intensity measuring circuit 19a measures the received field intensity of the received external radio wave, and notifies the CPU 11 of the measured received field intensity.

When the measured received field intensity of the external radio wave is less than a threshold value, the CPU 11 determines that the communication status of the DCL channel (i.e., the determination channel) is good, and when the measured received field intensity of the external radio wave is equal to or greater than the threshold value, the CPU 11 determines that the communication status of the DCL channel (i.e., the determination channel) is not-good. The threshold value is a value stored in the program for executing the DCL HP table generation processing. The threshold value may be a predetermined value stored in advance.

The BT communication control circuit 21 has a BT antenna 22, and is a circuit that transmits and receives digital signals made up of various data while making the radio communication 400 according to a frequency hopping method with the BT communication control circuit 71a of the BT unit 71. The BT communication control circuit 21 makes the radio communication 400 with the BT unit 71 while using a good channel or a not-good channel set in the BT communication processing (see FIG. 6) executed in the CPU 11 in each hopping period (e.g., $1/1600$ seconds). The BT communication processing will be described in detail later.

The BT communication control circuit 21 is provided with a received field intensity measuring circuit 21a. The received field intensity measuring circuit 21a is a circuit for measuring the received field intensity of an external radio wave received from the BT antenna 22 into the BT channel (e.g., a determination channel) designated from the CPU 11.

When the CPU 11 designates a BT channel (i.e., the determination channel) to the BT communication control circuit 21 during execution of the BT HP table generation processing (see FIG. 4) described later, the BT communication control circuit 21 receives an external radio wave from the BT antenna 22. Then, the received field intensity measuring circuit 21a measures the received field intensity of the received external radio wave, and notifies the CPU 11 of the measured received field intensity.

Then, when the measured received field intensity of the external radio wave is less than a threshold value, the CPU 11 determines that the communication status of the BT channel (i.e., the determination channel) is good, and when the measured received field intensity of the external radio wave is equal to or greater than the threshold value, the CPU 11 determines that the communication status of the BT channel (i.e., the determination channel) is not-good. The threshold value is a value stored in the program for executing the BT HP table generation processing. The threshold value may be a predetermined value stored in advance.

The handset 23 is a device for making a call, and has a microphone and a speaker. The voice processing circuit 24 is a circuit for converting an analog voice signal into a digital signal and converting a digital signal into an analog voice signal. The voice processing circuit 24 converts a digital signal which was transmitted from the DCL cordless phone 61 and received by the DCL communication control circuit 19 into an analog voice signal and outputs the converted signal to the handset 23 and the NCU 25. Further, the voice processing circuit 24 converts an analog voice signal output when a voice is input into the handset 23 and an analog voice signal received by the NCU 25 via the telephone network 100 from the external telephone 3 into digital signals (e.g., voice data) and outputs the converted digital signals to the DCL communication control circuit 19. The digital signals (e.g., voice data) input into the DCL communication control circuit 19 are transmitted to the DCL cordless phone 61 via the radio communication 300.

The NCU 25 is coupled to the telephone network 100 and sends a dial signal to the telephone network 100 and makes a response to a call signal from the telephone network 100 to control the call with the external telephone 3.

The printer 26 performs printing processing to perform printing on a recording sheet in a sheet feed cassette (not shown) provided in the printer 26 by using image data which was received through the radio communication 400 using BT and stored in the received data memory 13f.

[Access Point]

An electrical configuration of the access point 51 will now be described. The access point 51 is a transponder which is coupled to a LAN 500 and has a circuit for connecting a terminal device coupled via the radio communication 200 (i.e., each communication device to be coupled to the access point 51) to the LAN 500.

The access point 51 has a wireless LAN antenna 51a, and is configured so as to make the radio communication 200 with the wireless LAN communication control circuit 17 of the MFP 1. The MFP 1 and a plurality of terminal devices can be coupled simultaneously to the access point 51, and the terminal devices coupled to the access point 51 are coupled to the LAN 500 respectively.

[Cordless Phone]

An electrical configuration of the cordless phone 61 will now be described. The cordless phone 61 is a device for making a call with the MFP 1 and an external device coupled via the telephone network 100 via the radio communication 300 with the MFP 1. The cordless phone 31 has a DCL communication control circuit 61a and a DCL antenna 61b.

The DCL communication control circuit 61a is a circuit for transmitting and receiving digital signals made up of a call voice while making the radio communication 300 with the DCL communication control circuit 19 of the MFP 1 as a main phone by the DCL antenna 61b. The DCL communication control circuit 61a makes the radio communication 300 with the MFP 1 while performing hopping according to a DCL HP table transmitted from the MFP 1.

[BT Unit]

An electrical configuration of the BT unit 71 will now be described. The BT unit 71 is a device for making data communication via the radio communication 400 with the MFP 1. The BT unit 71 includes a function for requesting the MFP 1 to print an image and transmitting image data corresponding to the image. When transmitting the image data to the MFP 1, the BT unit 71 divides the image data to be transmitted into a plurality of packets and transmits the packets one packet at a time.

The BT unit 71 has a BT communication control circuit 71a and a BT antenna 71b. The BT communication control circuit 71a is a circuit for transmitting and receiving digital signals made up of various data while making the radio communication 400 with the BT communication control circuit 21 of the MFP 1 by using the BT antenna 71b. The BT communication control circuit 71a makes the radio communication 400 with the MFP 1 while performing hopping according to a BT good channel HP table and a BT not-good channel HP table transmitted from the MFP 1 and ratios stored in the channel ratio counter 13e.

[BT HP Table Generation Processing]

Figure 4:
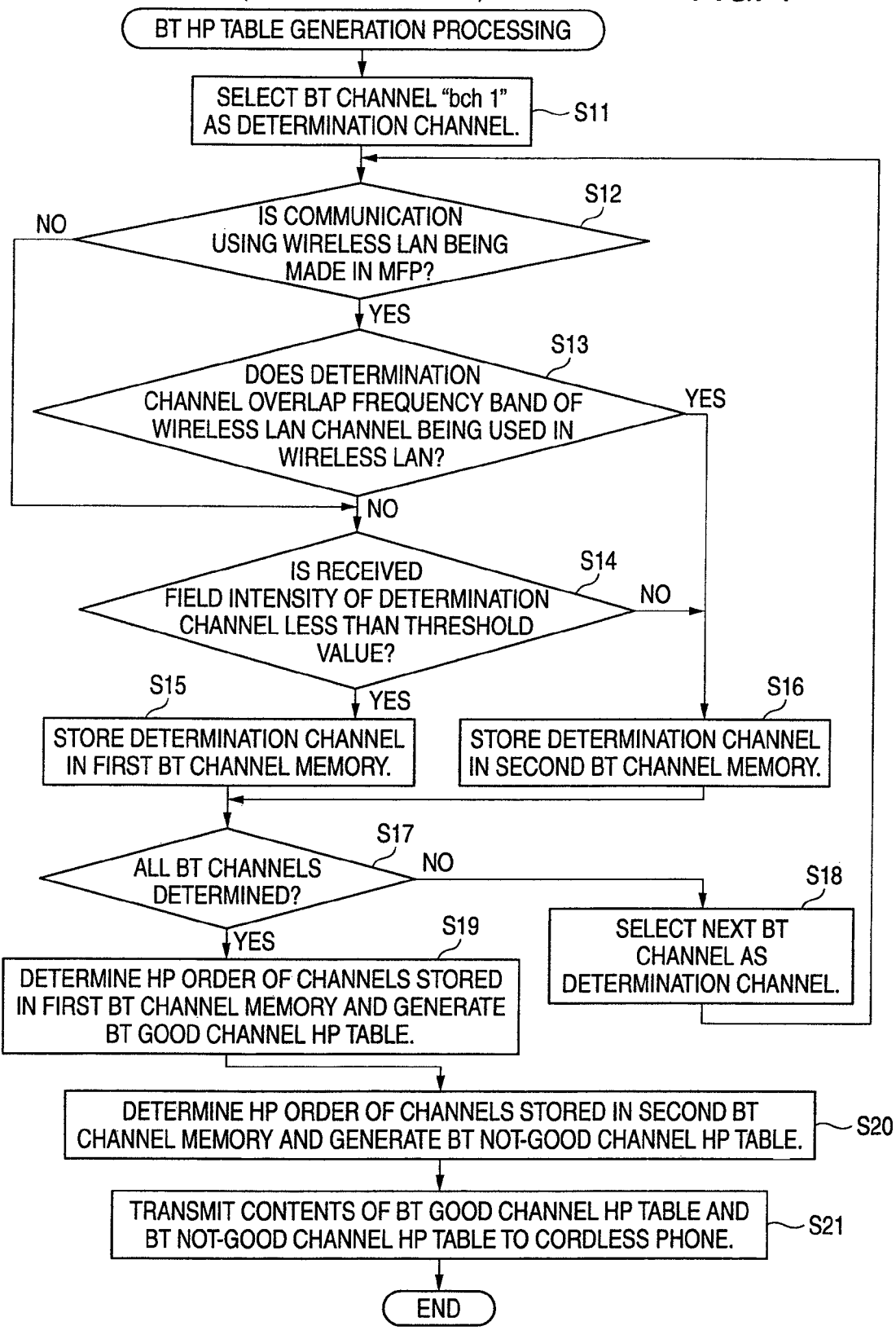
FIG. 4 is a flowchart showing BT HP table generation processing to be executed by the multifunction peripheral of FIG. 1.

With reference to FIG. 4, the processing flow of the BT HP table generation processing to be executed in the MFP 1 will now be described. FIG. 4 is a flowchart showing the BT HP table generation processing. The processing is for generating and updating a BT good channel HP table and a BT not-good channel HP table, and is executed by the CPU 11 periodically at a given interval of time, for example at intervals of 10 minutes.

In the processing, first, among 79 BT channels provided in the 2.4 GHz band, the BT channel "bch 1" is selected as a determination channel for which it is to be determined whether the communication status thereof is good (S11).

Next, the CPU 11 inquires to the wireless LAN communication control circuit 17 for the operation status, and receives notification whether the radio communication 200 using a wireless LAN is being made from the wireless LAN communication control circuit 17, and determines whether the radio communication 200 using a wireless LAN is being made in the MFP 1 (S12).

Then, when it is determined that the radio communication 200 using a wireless LAN is being made in the MFP 1 (S12: Yes), the wireless LAN channel being used in the wireless LAN is read from the wireless LAN channel memory 13d, a BT channel whose frequency band overlaps the frequency band of the wireless LAN channel is identified from the channel correspondence table (see FIG. 2) stored in the channel correspondence memory 12a, and it is determined whether the frequency band of the determination channel overlaps the frequency band of the wireless LAN channel being used in the wireless LAN (S13).

As a result, when it is determined that the determination channel overlaps the frequency band of the wireless LAN channel being used in the wireless LAN (S13: Yes), the frequency band of the determination channel is used by the wireless LAN, so that the communication status of the determination channel is determined as not-good, and the process shifts to the processing of S16.

Thus, the determination channel whose frequency band overlaps the frequency band of the wireless LAN channel to be used in the radio communication 200 using the wireless LAN of the MFP 1 is directly determined as a channel whose communication status is not-good, so that determination as to whether the communication status is good can be easily made. In addition, regarding a determination channel which overlaps the wireless LAN channel to be used in the radio communication 200 using a wireless LAN, there is no need to measure the communication status of the determination channel in actuality, so that the burden on the determination of the communication status can be reduced.

On the other hand, as a result of the processing of S12, when it is determined that the radio communication 200 using a wireless LAN is not made in the MFP 1 (S12: No), and as a result of the processing of S13, when it is determined that the determination channel does not overlap the frequency band of the wireless LAN channel being used in the wireless LAN (S13: No), the determination channel is designated to the BT communication control circuit 21. Accordingly, the received field intensity of the external radio wave of the determination channel is measured by the received field intensity measuring circuit 21a, so that it is determined next whether the measured received field intensity is less than a threshold value (S14). The threshold value may be predetermined.

Here, when it is determined that the received field intensity of the external radio wave of the determination channel is less than the threshold value (S14: Yes), the determination channel is not influenced by the external radio wave, so that the communication status of the determination channel is determined as good, and the process shifts to the processing of S15. On the other hand, when it is determined that the received field intensity of the external radio wave measured in the determination channel is equal to or greater than the threshold value (S14: No), the determination channel receives interference by the external radio wave, so that the communication status of the determination channel is determined as not-good, and the process shifts to the processing of S16. Thus, according to the field intensity of the external radio wave, it is determined whether the communication status of the determination channel is good, so that the determination can be accurately made.

Subsequently, in the processing of S15, the channel number of the determination channel whose communication status was determined as good in the processing of S14 is stored in the first BT channel memory 13a, and the process shifts to the processing of S17. On the other hand, in the processing of S16, the determination channel whose communication status was determined as not-good in the processings of S13 and S14 is stored in the second BT channel memory 13b and the process shifts to the processing of S17. Accordingly, the BT channel whose communication status is determined as good and the BT channel whose communication status is determined as not-good can be classified into the first and second BT channel memories 13a and 13b respectively.

In the processing of S17, it is determined whether a determination of good or not-good has been made for all 79 BT channels. When it is determined that a determination has not been made for all BT channels, i.e., that some channels remain to be checked (S17: No), the BT channel next to the BT channel whose communication status is determined most recent is selected as a determination channel (S18).

For example, when the most recent determination channel is the BT channel "bch 1," the BT channel "bch 2" is newly selected as the determination channel, and when the most recent determination channel is the BT channel "bch 39," the BT channel "bch 40" is newly selected as the determination channel. After the determination channel is newly selected in the processing of S18, the process returns to the processing of S12, and it is determined whether the communication status of the newly selected determination channel is good.

In the processing of S17, until it is determined that all BT channels have been determined to be good or not-good (S17: Yes), the processing of S12 to S18 is repeated. In other words, the processing operations of S12 to S18 are repeated for each BT channel. Accordingly, all BT channels are determined to have either a good or not-good communication status, and all of the BT channels whose communication statuses are determined as good are stored in the first BT channel memory 13a. The BT channels whose communication statuses are determined as not-good are all stored in the second BT channel memory 13b.

Then, as a result of the processing of S17, when it is determined that all BT channels have been determined to be good or not-good (S17: Yes), the process proceeds to the processing of S19. In the processing of S19, the BT channels stored in the first BT channel memory 13a, that is, the BT channels whose communication channels were determined as good are rearranged randomly and a hopping order (i.e., a HP order) is determined. Accordingly, the BT good channel HP table as shown in FIG. 3A is generated and stored in the first DCL channel memory 13a.

Then, the BT channels stored in the second BT channel memory 13b, that is, the BT channels whose communication statuses were determined as not-good are rearranged randomly and a hopping order (i.e., a HP order) is determined (S20). Accordingly, the BT not-good channel HP table as shown in FIG. 3B is generated and stored in the second DCL channel memory 13b.

Then, the BT good channel HP table and the BT not-good channel HP table stored in the first and second BT channel memories 13a and 13b, respectively, are transmitted to the cordless phone 61 (S21), and the BT HP table generation processing is ended. Accordingly, the cordless phone 61 can be provided with common HP tables.

[DCL HP Table Generation Processing]

Figure 5:
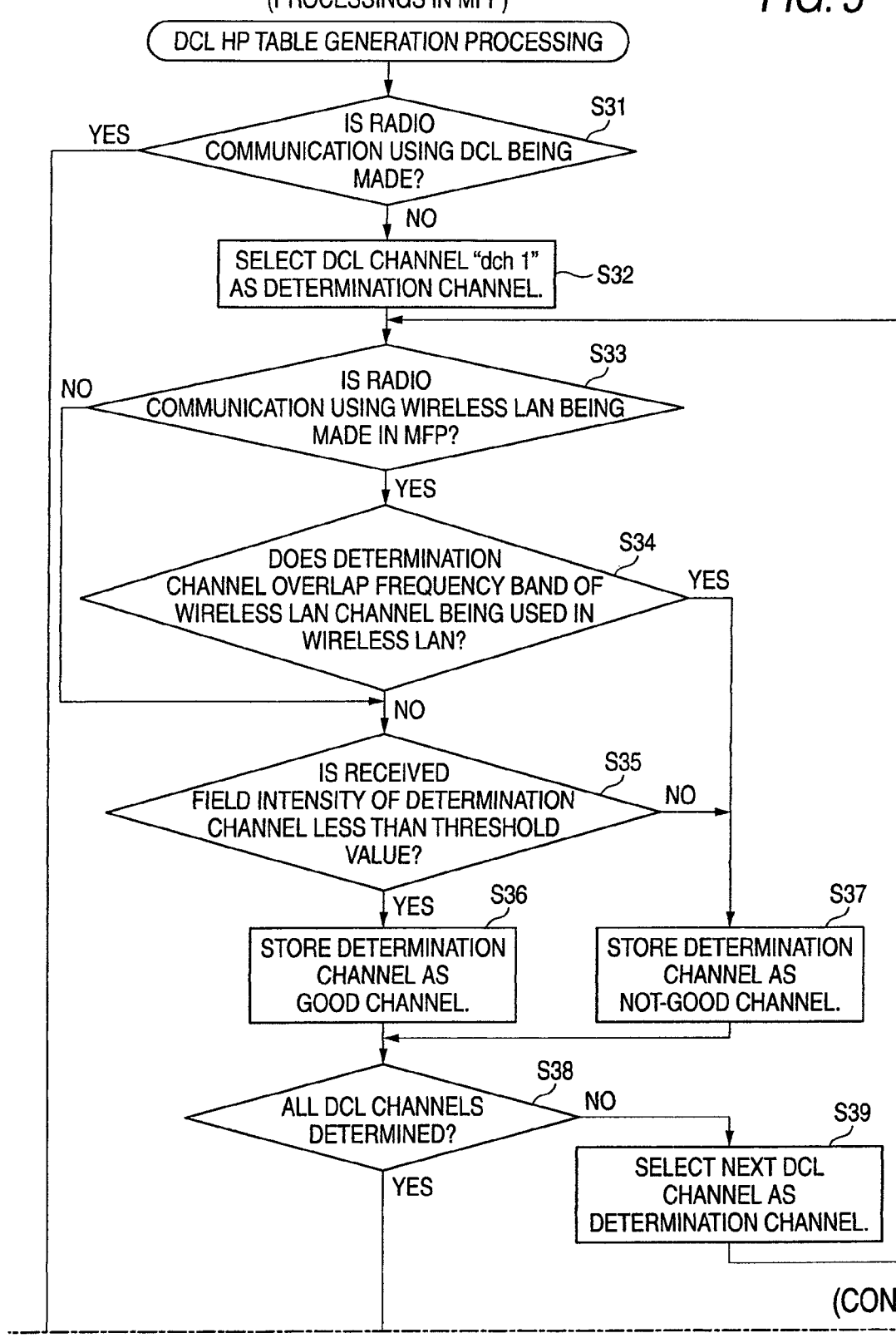
FIG. 5 is a flowchart showing DCL HP table generation processing to be executed by the multifunction peripheral of FIG. 1.
Figure 6:
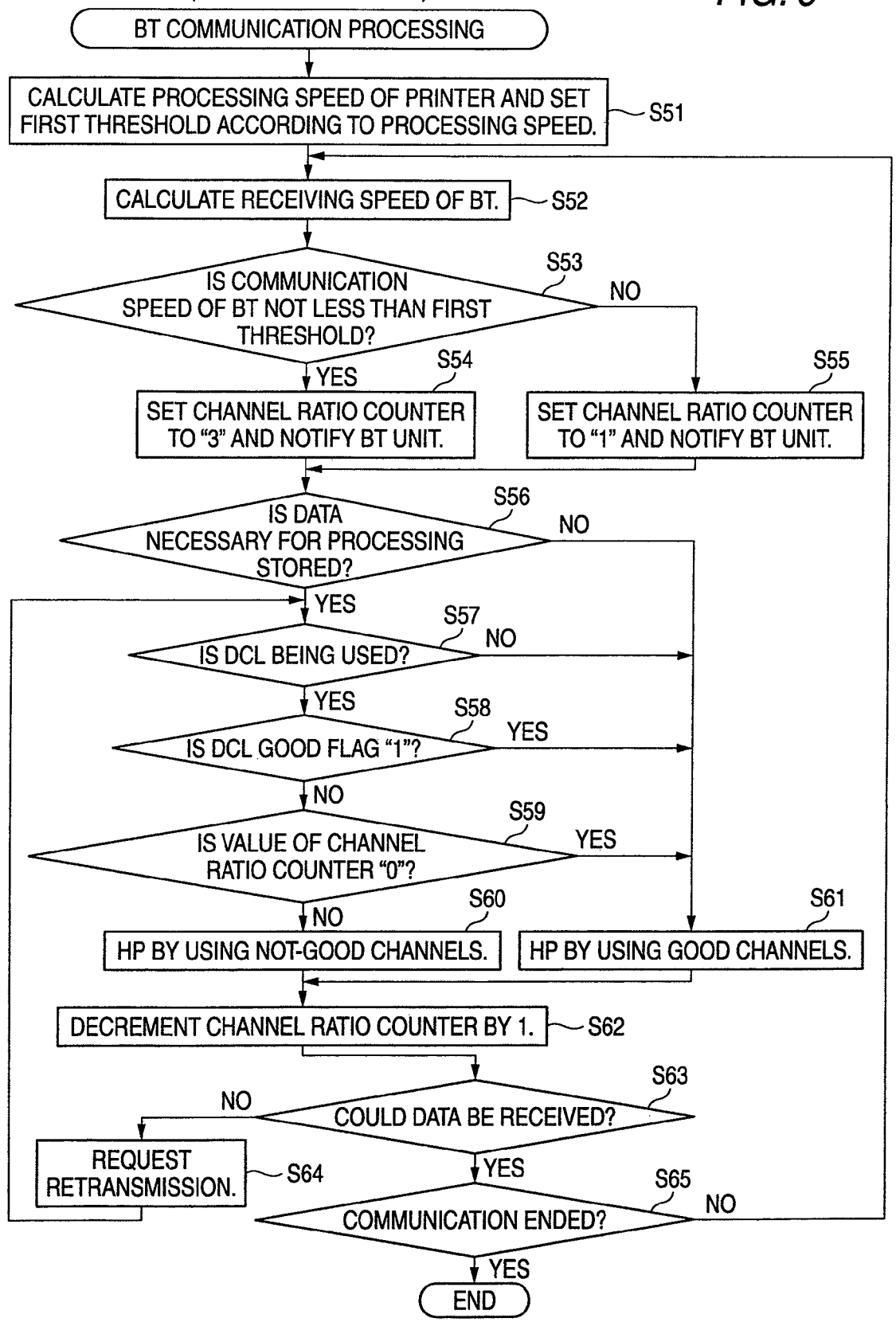
FIG. 6 is a flowchart showing BT communication processing to be executed by the multifunction peripheral of FIG. 1.

With reference to FIG. 5, the processing flow of the DCL HP table generation processing to be executed in the MFP 1 will now be described. FIG. 5 is a flowchart showing the DCL HP table generation processing. The processing is for generating and updating the DCL HP table, and is executed by the CPU 11 periodically at a given interval of time, for example at intervals of 10 minutes.

In the DCL HP table generation processing, first, it is determined whether the radio communication 300 using DCL is being made (S31). This first operation is performed because, in the DCL HP table generation processing, an external radio wave is received by using the DCL communication control circuit 19 and the received field intensity of the external radio wave is measured, so that the received field intensity of the external radio wave is measured when the radio communication 300 using DCL is being made. However, during the received field intensity measurement, the radio communication 300 which is occurring in real time must be suspended. In other words, any call between the MFP 1 and the cordless phone 61 must be disconnected in order for the DCL HP generation processing to measure the received field intensity.

Accordingly, as the first operation in the DCL HP table generation processing, it is determined whether the radio communication 300 using DCL is being made. If it is determined that the radio communication 300 using DCL is being made (S31: Yes), the DCL HP table generation processing is ended in order to prevent a call that is in process from being disconnected.

On the other hand, when it is determined that the radio communication 300 using DCL is not being made (S31: No), next, the DCL channel "dch 1" among the 89 DCL channels provided in the 2.4 GHz band is selected as a determination channel to be determined whether the communication status thereof is good (S32).

Next, the processing of operations S33 and S34 are performed. Operations S33 and S34 are the same as operations S12 and S13 shown in FIG. 4 and described above with reference to the BT HP table generation processing, except that, in S34, instead of the channel correspondence table stored in the channel correspondence memory 12a, the table in which the wireless LAN channels and the DCL channels stored in the ROM 12 are made correspondent to each other is referred to. Accordingly, when the radio communication 200 using a wireless LAN is made in the MFP 1 and the determination channel overlaps the frequency band of the wireless LAN channel being used in the wireless LAN, the frequency band of the determination channel is used by the wireless LAN, so that the communication status is determined as not-good, and the process shifts to the processing of S37. On the other hand, when the radio communication 200 using the wireless LAN is not made in the MFP 1, and when the determination channel does not overlap the frequency band of the wireless LAN channel being used in the wireless LAN, the process shifts to the processing of operation S35.

In the processing of S35, by designating the determination channel to the DCL communication control circuit 19, the received field intensity of an external radio wave of the determination channel is measured by the received field intensity measuring circuit 19a, so that it is determined whether the measured received field intensity is less than a threshold value. The threshold value may be predetermined.

When it is determined that the received field intensity of the external radio wave of the determination channel is less than the threshold value (S35: Yes), the determination channel is not influenced by the external radio wave, so that the communication status of the determination channel is determined as good, and the process shifts to the processing of S36. On the other hand, when it is determined that the received field intensity of the external radio wave measured in the determination channel is equal to or greater than the threshold value (S35: No), the determination channel receives interference from an external radio wave, so that the communication status of the determination channel is determined as not-good, and the process shifts to the processing of S37. Thus, according to the field intensity of the external radio wave, it is determined whether the communication status of the determination channel is good, so that the determination can be accurately made.

Subsequently, in the processing of S36, channel numbers of determination channels whose communication statuses were determined as good in the processing of S35 are stored as good channels in the RAM 13, and the process shifts to the processing of S38. On the other hand, in the processing of S37, determination channels whose communication statuses were determined as not-good in the processing of S34 and S35 are stored as not-good channels in the RAM 13, and the process shifts to the processing of S38. Accordingly, DCL channels whose communication statuses were determined as good and DCL channels whose communication statuses were determined as not-good can be classified into good channels and not-good channels respectively.

In the processing of S38, it is determined whether the communication status has been determined as good or not-good for all 89 DCL channels. Then, when it is determined that the communication status has not yet been determined for all DCL channels (S38: No), the DCL channel next to the DCL channel whose communication status is determined most recent is selected as the determination channel (S39).

For example, when the most recent determination channel is the DCL channel "dch 1," the DCL channel "dch 2" is newly selected as the determination channel, and when the most recent determination channel is the DCL channel "dch 39," the DCL channel "dch 40" is newly selected as the determination channel. After the determination channel is newly selected in the processing of S39, the process returns to the processing of S33, and it is determined whether the communication status of the newly selected determination channel is good.

Then, the processing of operations S33 to S39 is repeated unit it is determined in operation S38 that a communication status has been determined for all DCL channels (S38: Yes). Accordingly, a communication status is determined for all DCL channels, and DCL channels whose communication statuses were determined as good are stored as good channels and DCL channels whose communication statuses were determined as not-good are stored as not-good channels in the RAM 13.

As a result of the processing of S38, when it is determined that a communication status has been determined for all DCL channels (S38: Yes), the process proceeds to the processing of S40. In the processing of S40, it is determined whether the number of DCL channels stored as good channels in the RAM 13 is equal to or greater than 45.

When it is determined that the number of DCL channels stored as good channels is less than 45 (S40: No), all good channels and a part of the not-good channels stored in the RAM 13 are selected to secure 45 DCL channels, and the secured DCL channels are rearranged randomly to generate a DCL HP table (S41) Then, the DCL good flag 13g is set to "0" indicating that not-good channels are included in the DCL HP table (S42), and then the process shifts to the processing of S45.

On the other hand, when it is determined that the number of DCL channels stored as good channels is equal to or greater than 45 (S40: Yes), 45 DCL channels are secured among the good channels stored in the RAM 13, and the secured DCL channels are rearranged randomly to generate a DCL HP table (S43). Then, the DCL good flag 13g is set to "1" indicating that all the DCL channels included in the DCL HP table are good channels (S44), and then the process shifts to the processing of S45.

In the processing of S45, the DCL HP table is stored in the DCL channel memory 13c, and transmitted to the cordless phone 61. Then, the DCL HP table generation processing is ended.

Accordingly, the MFP 1 and the cordless phone 61 can be provided with common DCL HP tables, and according to the DCL HP tables, the radio communication 300 using DCL can be made. The DCL HP table is generated by advantageously using DCL channels whose communication statuses were determined as good, so that the radio communication 300 using DCL can be made by using DCL channels whose communication statuses were determined as good as much as possible. Accordingly, a call between the MFP 1 and the cordless phone 61 in real time can be made with high quality.

[BT Communication Processing]

Next, with reference to FIG. 6, the processing flow of the BT communication processing to be executed in the MFP 1 will be described. FIG. 6 is a flowchart showing the BT communication processing. The processing is for setting a BT channel to be used in the radio communication 400 using BT, and is executed by the CPU 11 when the BT unit 71 issues a printing request of an image to the MFP 1.

In the processing, first, the processing speed of the printing processing in the printer 26 in the case where an image is printed in response to the request from the BT unit 71 is calculated, and according to the processing speed, an image data minimum required receiving speed for the printer 26 to perform printing processing without generating errors or generating a delay is calculated, and a value obtained by adding a margin value to the minimum required receiving speed is set as a first threshold (S51). The first threshold is stored in the RAM 13. The margin value may be predetermined.

Next, from the data receiving status in the BT communication control circuit 21, the receiving speed in the radio communication 400 using BT is calculated (S52). Then, it is determined whether the receiving speed calculated in the processing of S52 is equal to or greater than the first threshold (S53), and when it is determined that the receiving speed is equal to or greater than the first threshold (S53: Yes), the receiving speed in the radio communication 400 can be determined as sufficiently higher than the minimum required receiving speed for the printer 26 to perform the printing processing without generating errors or generating a delay. Thus, the channel ratio counter 13e is set to "3," and the BT unit 71 is notified of the value (S54). Accordingly, as the BT channel to be used in the radio communication 400, a good channel is set at a ratio of 1/4, and a not-good channel is set at a ratio of 3/4.

On the other hand, when the receiving speed calculated in the processing of S52 is determined to be less than the first threshold stored in the RAM 13 in the processing of S51 (S53: No), the receiving speed in the radio communication 400 can be determined as close to the minimum required receiving speed for the printer 26 to perform printing processing without generating errors or generating a delay, or smaller than the minimum required receiving speed. Thus, the channel ratio counter 13e is set to "1," and the BT unit 71 is notified of the value (S55). Accordingly, as the BT channel to be used in the radio communication 400, a good channel is set at a ratio of 1/2, and a not-good channel is set at a ratio of 1/2.

Thus, in the processing of operations S51 to S55, when the receiving speed in the radio communication 400 is sufficiently higher than the minimum required receiving speed for performing printing processing without waiting processing, etc., the ratio of setting a not-good channel is increased, and when the receiving speed in the radio communication 400 is close to the minimum required receiving speed for performing printing processing or smaller than the minimum required receiving speed, the ratio of setting a good channel is increased.

Then, it is determined whether image data used for the immediate printing processing is stored in the received data memory 13f (S56). When it is determined that image data used for the immediate printing processing is not stored in the received data memory 13f (S56: No), the process shifts to the processing of S61, and during one hopping period, according to the HP order 13a1 in the BT good channel HP table stored in the first BT channel memory 13a, the good channel is set as the BT channel to be used in the radio communication 400 using BT.

Accordingly, while a good channel is set as the BT channel to be used in the radio communication 400 using BT, the communication quality of the radio communication 400 is improved, so that image data necessary for the immediate printing processing can be received quickly. Therefore, even in an environment involving channels which cause radio wave interference, the time for waiting the printing processing can be shortened.

On the other hand, when it is determined that image data used for the immediate printing processing is stored in the received data memory 13f (S56: Yes), subsequently, the operation status of the DCL communication control circuit 19 is confirmed and it is determined whether the radio communication 300 using DCL is being made (S57). Then, when it is determined that the radio communication 300 using DCL is not being made (S57: No), the process shifts to the processing of S61, and as described above, during one hopping period, a good channel is used as the BT channel to be used in the radio communication 400 using BT.

Accordingly, while the radio communication 300 using DCL is not being made, a good channel is used in the radio communication 400 using BT, and even when the good channel is used, radio wave interference does not occur at least with the radio communication 300. Therefore, in the radio communication 400 using BT, image data to be subjected to printing processing can be reliably received.

On the other hand, when it is determined that the radio communication 300 using DCL is being made (S57: Yes), it is further determined whether the DCL good flag 13g is "1" (S58). When it is determined that the DCL good flag 13g is "1" (S58: Yes), it can be determined that all of the 45 DCL channels used in the DCL HP table stored in the DCL channel memory 13c are good channels, so that the process shifts to the processing of S61, and as described above, during one hopping period, a good channel is set as the BT channel to be used in the radio communication 400 using BT.

Accordingly, image data to be printed can be reliably received through the radio communication 400 using BT, and a call between the MFP 1 and the cordless phone 61 can be made by using a good channel even in the radio communication 300 using DCL, so that there is an effect that the call quality can be maintained high.

On the other hand, when the DCL good flag 13g is determined as "0" (S58: No), subsequently, it is determined whether the value of the channel ratio counter 13e is "0" (S59) As a result, when it is determined that the value of the channel ratio counter 13e is a value other than "0" (S59: No), during one hopping period, according to the HP order 13b1 in the BT not-good channel HP table stored in the second BT channel memory 13b, a not-good channel is set as the BT channel to be used in the radio communication 400 using BT (S60).

On the other hand, when the value of the channel ratio counter 13e is determined as the value of "0" (S59: Yes), during one hopping period, according to the HP order 13a1 in the BT good channel HP table stored in the first BT channel memory 13a, a good channel is set as the BT channel to be used in the radio communication 400 using BT (S61).

Then, the value of the channel ratio counter 13e is decremented by "1" and the process shifts to the processing of S63. However, when the value of the channel ratio counter 13e before being decremented is "0,", the initial value of the channel ratio counter 13e (i.e., the value set in the processing of operations S54, S55) is reset set in the channel ratio counter 13a.

By the processing of operations S59 to S62, at the ratios according to the value of the channel ratio counter 13e set by the processing of operations S54 and S55, a good channel and a not-good channel can be set as the BT channel to be used in the radio communication 400.

In the processing of S63, it is determined whether image data is successfully received from the BT unit 71 via the radio communication 400 using BT during one hopping period. Then, when it is determined that image data could not be successfully received (S63: No), the BT unit 71 is requested to retransmit the image data (S64), and the process returns to the processing of S57. Accordingly, until it is determined that the image data is successfully received during one hopping period in the processing of S63 (S63: Yes), the processing of operation S57 to S64 are repeated.

Then, as a result of the processing of S63, when it is determined that the image data is successfully received (S63: Yes), it is determined whether all image data to be subjected to printing processing have been received from the BT unit 71 and the radio communication 400 has ended (S65). As a result, when it is determined that the radio communication 400 has not ended (S65: No), the process returns to the processing of S52, and until it is determined in the processing of S65 that the radio communication 400 has ended (S65: Yes), the processing of operations S52 to S65 is repeated. When it is determined that the radio communication 400 has ended (S65: Yes), the BT communication processing is ended.

As described above, by executing the BT communication processing of the MFP 1, when the receiving speed in the radio communication 400 using BT is sufficiently higher than the minimum required receiving speed for performing printing processing without generating errors or delay in the printer 26, the ratio of setting a not-good channel is increased. In the case, the receiving speed is sufficiently high, so that even when the ratio of setting a not-good channel is increased, data can be reliably received, and accordingly, even in an environment involving fewer good channels, the radio communication 400 using BT can be reliably made while using fewer good channels and not-good channels.

On the other hand, when the receiving speed in the radio communication 400 is close to the minimum required receiving speed for performing the printing processing, or is smaller than the minimum required receiving speed, the ratio of setting a good channel is increased. Accordingly, the communication quality of the radio communication 400 using BT is improved, so that in a status with the low receiving speed, the data amount to be received without errors can be increased, and errors and delay generated in the printing processing due to a lack of the received data can be reduced.

Therefore, based on the relationship between the data receiving speed and the processing speed, by changing the ratios of setting a good channel and a not-good channel as the BT channel to be used in the radio communication 400 using BT, even in an environment involving BT channels which cause radio wave interference, influence of the radio wave interference can be reliably reduced.

As the ratios set in operations S54, S55, by setting ratios at which a not-good channel is used as much as possible in a range that data can be received securely in the radio communication 400 using BT, radio wave interference can be reduced in the case where the radio communication 300 using DCL uses a good channel. Therefore, the call quality between the MFP 1 and the cordless phone 61 to be made through the radio communication 300 using DCL can be improved. Particularly, the radio communication 300 using DCL in real time is improved, so that the use of good channels in such radio communication 300 is useful for improvement in performance of the MFP 1.

Second Exemplary Embodiment

Figure 7:
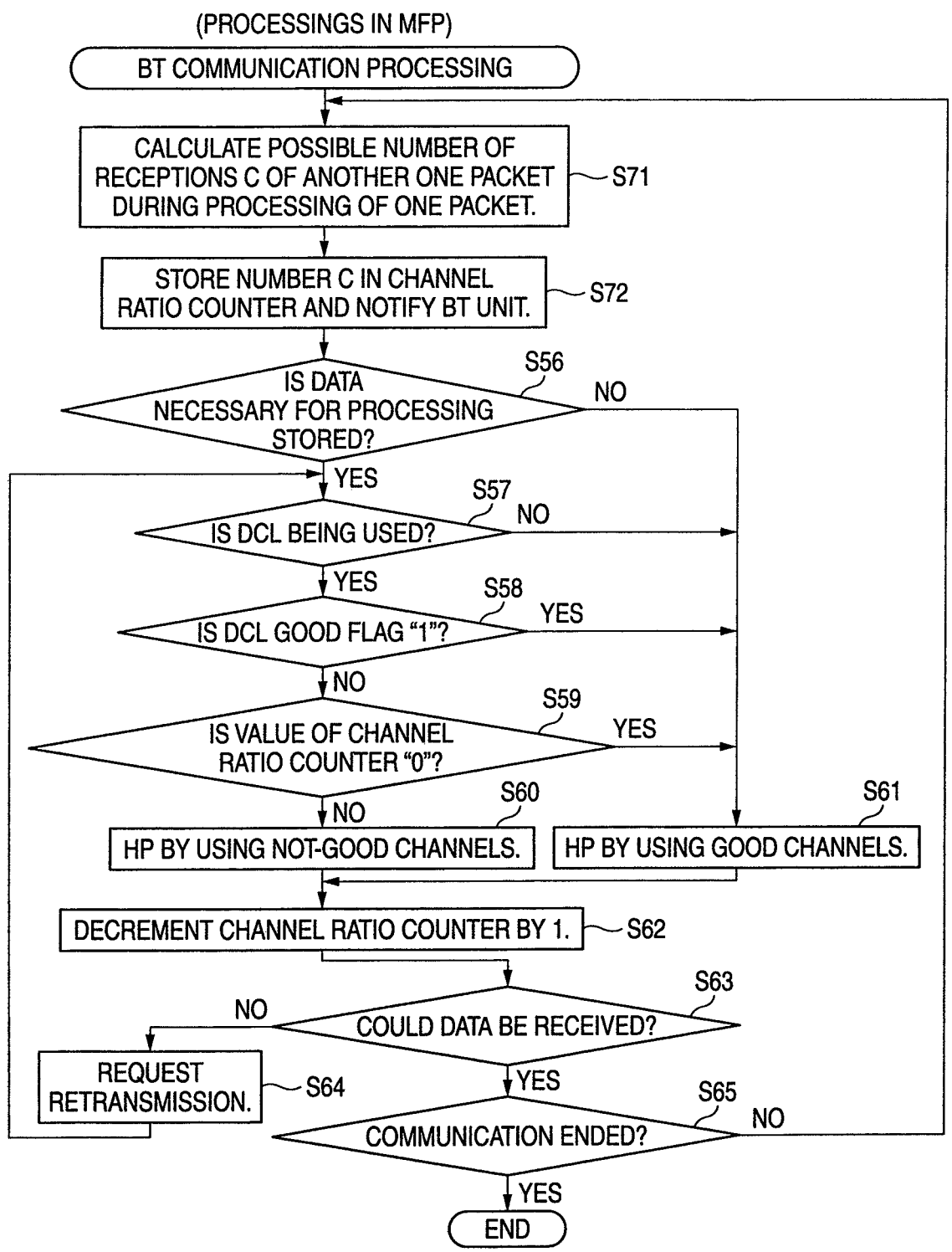
FIG. 7 is a flowchart showing BT communication processing to be executed by a multifunction peripheral according to a second exemplary embodiment of the present invention.

With reference to FIG. 7, an MFP 1 according to a second exemplary embodiment of the present invention will now be described. In the first exemplary embodiment, the case is described in which ratios of setting a good channel and a not-good channel as the BT channel to be used in the radio communication 400 using BT are changed based on the relationship between the data receiving speed and processing speed. By contrast, in the second exemplary embodiment, the ratios are changed according to a possible number of receptions of a future packet in the MFP 1 via the radio communication 400 during the printing processing by the printer 26 of the image data included in one packet generated by dividing image data by the BT unit 71.

The electrical configuration of the radio communication system including the MFP 1 of the second exemplary embodiment is the same as that of the radio communication system (see FIG. 1) including the MFP 1 of the first exemplary embodiment. Moreover, the BT HP table generation processing and DCL HP table generation processing to be executed in the MFP 1 of the second exemplary embodiment are the same as the BT HP table generation processing (see FIG. 4) and the DCL HP table generation processing (see FIG. 5) to be executed in the MFP 1 of the first exemplary embodiment. Hereinafter, the same components as those in the first exemplary embodiment are designated by the same reference numbers, and description thereof is omitted.

FIG. 7 is a flowchart showing BT communication processing to be executed in the MFP 1 of the second exemplary embodiment. The processing is different from the BT communication processing (see FIG. 6) of the first exemplary embodiment in that the processing of operations S51 to S55 of the BT communication processing of the first exemplary embodiment are replaced by the processing of operations S71 and S72. The processing of other operations are the same as those in the BT communication processing of the MFP 1 of the first exemplary embodiment.

In the BT communication processing of the second exemplary embodiment, a possible number of receptions C of a future packet via the radio communication 400 during the printing processing by the printer 26 of image data included in one packet received from the BT unit 71 is calculated (S71). The number C can be calculated by, for example, estimating a time used for printing processing from the data amount of the image data included in one packet and dividing the time by a packet transmission period of the BT unit 71.

The number C is set in the channel ratio counter 13e, and the BT unit 71 is notified of the value (S72). Accordingly, as the BT channel to be used in the radio communication 400, a good channel is set at a ratio of 1/(C+1), and a not-good channel is set at a ratio of C/(1+C). Accordingly, when the number C is large, the ratio of setting a not-good channel is increased, and when the number C is small, the ratio of setting a good channel is increased.

After the processing of S72, the processing of operations S56 to S65 is executed, and according to the status of the radio communication 300 using DCL and the ratios corresponding to the value of the channel ratio counter 13e, a good channel and a not-good channel are set as the BT channel to be used in the radio communication 400. Then, by the processing of S65, when it is determined that the radio communication 400 has not ended (S65: No), the process returns to the processing of S71, and the processing of operations S71, S72, and S56 to S65 is executed again, and when it is determined that the radio communication 400 has ended (S65: Yes), the BT communication processing is ended.

As described above, by executing the BT communication processing by the MFP 1, when the possible number of receptions C of a future packet via the radio communication 400 during printing processing of image data included in one packet received from the BT unit 71 by the printer 26 is large, the ratio of setting a not-good channel is increased. In such a case, even when the ratio of setting a not-good channel is increased, during processing of the image data included in one packet, another packet can be repeatedly transmitted and received, so that data receiving can be reliably performed. Therefore, even in an environment involving fewer good channels, the radio communication 400 using BT can be reliably made while using fewer good channels and not-good channels.

On the other hand, when the number C is small, by increasing the ratio of setting a good channel as the BT channel to be used in the radio communication 400, the communication quality of the radio communication 400 is improved, so that the data amount to be received without errors can be increased. Therefore, errors and delays generated in the processing due to a lack of received data can be reduced.

Therefore, according to the possible number of receptions C of a future packet during processing of image data included in one packet, by changing the ratios of setting a good channel and a not-good channel as the BT channel to be used by the radio communication 400 using BT, even in an environment involving channels which cause radio wave interference, influence of the radio wave interference can be reliably reduced.

Third Exemplary Embodiment

An MFP 1 of a third exemplary embodiment of the present invention will now be described with reference to FIG. 8. In the first exemplary embodiment, the case is described in which the ratios of setting a good channel and a not-good channel as the BT channel to be used in the radio communication 400 using BT are changed based on the relationship between the data receiving speed and processing speed. By contrast, in the third exemplary embodiment, the ratios are changed based on a time at which unreceived image data becomes necessary in the printing processing of the printer 26 in the MFP 1.

The electrical configuration of the radio communication system including the MFP 1 of the third exemplary embodiment is the same as that of the radio communication system (see FIG. 1) including the MFP 1 of the first exemplary embodiment. Further, the BT HP table generation processing and DCL HP table generation processing to be executed in the MFP 1 of the third exemplary embodiment are the same as the BT HP table generation processing (see FIG. 4) and the DCL HP table generation processing (see FIG. 5) to be executed in the MFP 1 of the first exemplary embodiment, respectively. Hereinafter, the same components as those in the third exemplary embodiment are designated by the same reference numbers, and description thereof is omitted.

Figure 8:
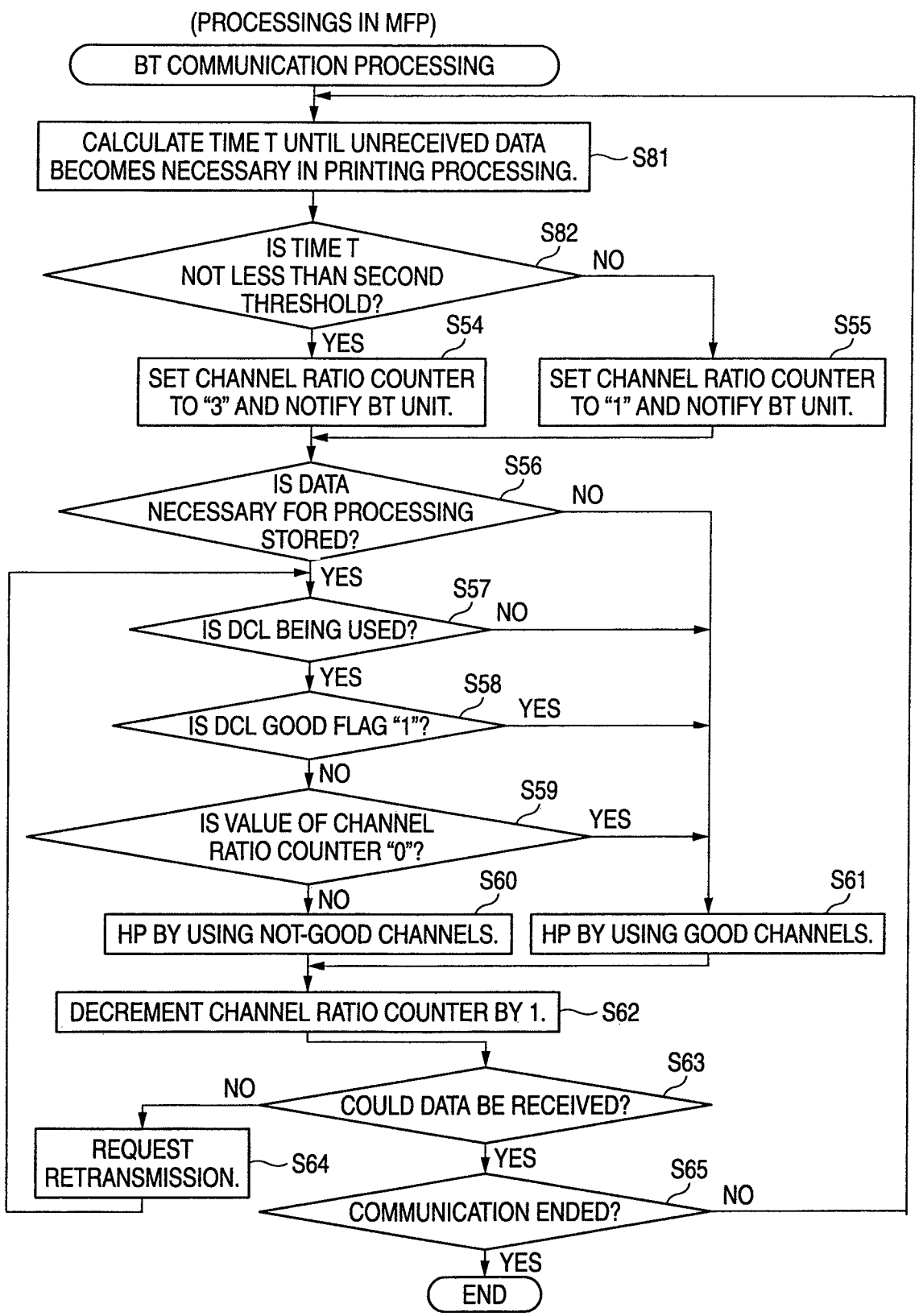
FIG. 8 is a flowchart showing BT communication processing to be executed by a multifunction peripheral according to a third exemplary embodiment of the present invention.

FIG. 8 is a flowchart showing BT communication processing to be executed in the MFP 1 of the third exemplary embodiment. The processing is different from the BT communication processing (see FIG. 6) of the first exemplary embodiment in that the processing of operations S51 to S53 of the BT communication processing of the first exemplary embodiment are replaced by the processing of operations S81 and S82. The processing of other operations is the same as in the BT communication processing in the MFP 1 of the first exemplary embodiment.

In the BT communication processing of the third exemplary embodiment, first, a time T until image data unreceived in the MFP 1 becomes necessary in the printing processing of the printer 26 is calculated (S81). The time T can be calculated by dividing data amount by a processing speed of the printing processing upon calculating the data amount of image data which is not used in the print processing among image data stored in the received data memory 13f in a case where image data is transmitted from the BT unit 71 in the order to be used in the printing processing.

Next, it is determined whether the time T calculated in the processing of S81 is equal to or greater than a second threshold (S82). The second threshold is a value set in the program for executing the processing. The second threshold may be predetermined and set in advance.

Then, when it is determined that the time T calculated in the processing of S81 is equal to or greater than the second threshold (S82: Yes), it can be determined that there is excess time until unreceived image data becomes necessary in the printing processing, so that the process shifts to the processing of S54, and the channel ratio counter 13e is set to "3".

On the other hand, as a result of the processing of S82, when it is determined that the time T calculated in the processing of S81 is less than the second threshold (S82: No), it can be determined that there is no excess time until unreceived image data becomes necessary in the printing processing, so that the process shifts to the processing of S55, and the channel ratio counter 13e is set to "1."

Accordingly, when there is sufficient time until the printing processing requires unreceived image data (e.g., the printing processing is not waiting for the unreceived image data), the ratio of setting a not-good channel is increased, and when there is no or a little time until the printing processing requires unreceived image data (e.g., the print processing is waiting for or ready to wait for the unreceived image data), the ratio of setting a good channel is increased.

After the processing of S54 or S55, the processing of operations S56 to S65 are executed, and according to the status of the radio communication 300 using DCL and ratios corresponding to the value of the channel ratio counter 13e, a good channel and a not-good channel are set as the BT channel to be used in the radio communication 400. Then, by the processing of S65, when it is determined that the radio communication 400 has not ended (S65: No), the process returns to the processing of S81, and the processing of operations S81, S82, and S56 to S65 are executed again, and when it is determined that the radio communication 400 has ended (S65: Yes), the BT communication processing is ended.

As described above, by executing the BT communication processing in the MFP 1, when there is excess time until unreceived image data becomes necessary in the printing processing, the ratio of setting a not-good channel is increased. In such a case, even when the ratio of setting a not-good channel is increased, if the increase is to an extent allowing the image data to be received before it becomes necessary in the printing processing, the printing processing can be performed without generating errors and delay. Therefore, even in an environment involving fewer good channels, the radio communication 400 using BT can be reliably made while using fewer good channels and not-good channels.

On the other hand, when there is no excess time until unreceived image data becomes necessary in the printing processing, the ratio of setting a good channel as the BT channel to be used in the radio communication 400 is increased, so that the communication quality of the radio communication 400 can be improved. Therefore, image data which becomes necessary in the printing processing can be received quickly, and errors and delay generated in the printing processing due to a lack of received data can be reduced.

Therefore, based on the time T at which unreceived image data becomes necessary in the printing processing, by changing the ratios of setting a good channel and a not-good channel as the BT channel to be used in the radio communication 400 using BT, even in an environment involving channels which cause radio wave interference, influence of the radio wave interference can be reliably reduced.

Additional Modifications and Embodiments

It should be noted that the values used in the respective exemplary embodiments described above are examples, and as a matter of course, other values can be adopted.

In the respective exemplary embodiments described above, the radio communication 400 using Bluetooth is described as an example of radio communication in which the ratio of setting a good channel and the ratio of setting a not-good channel as channels to be used are changed. However, the radio communication is not necessarily limited to this, and any radio communication can be applied as long as the radio communication is made according to a frequency hopping method. In such a case, the MFP 1 may be provided with a radio communication control circuit adapted to the radio communication. Further, in such a case, when data could not be correctly transmitted or received due to radio wave interference etc., radio communication including a mechanism for retransmitting the data may be applied. Accordingly, even when the ratio of setting a not-good channel as the channel to be used is increased, correct data can be transmitted or received eventually.

In the respective exemplary embodiments described above, the MFP 1 having the wireless LAN function and the DCL function is described, however, the MFP 1 does not necessarily need to have either one or both of these functions. Instead of either one or both of these, the MFP 1 may have a radio communication function according to another radio communication method using a part or the whole of the 2.4 GHz band. In such a case, the MFP 1 may be provided with a radio communication control circuit adapted to the radio communication method.

In the respective exemplary embodiments described above, the case where the MFP 1 receives image data through the radio communication 400 using BT and performs printing processing by using the image data, is described. However, the type of the data to be received and the contents of the processing using the data may be any type of data and contents. For example, moving image data may be received and subjected to streaming reproduction processing.

In the respective exemplary embodiments described above, the case is described in which it is determined whether the communication statuses of BT channels and DCL channels are good according to received field intensities of external radio waves to be received in the BT channels and DCL channels. However, the communication statuses may be configured to be determined based on bit error rates (BER). In such a case, the BT communication control circuit 21 of the MFP 1 may be provided with a BER measuring circuit, and the BT unit 71 may be provided with a BER measuring radio wave transmission circuit. In addition, the DCL communication control circuit 19 may be provided with a BER measuring circuit, and the DCL communication control circuit 39 of the cordless phone 31 may be provided with a BER measuring radio wave transmission circuit. For example, when the communication status of a BT channel is determined, a BER measuring radio wave may be transmitted from the BER measuring radio wave transmission circuit of the BT unit 71 by using the BT channel to be determined, and the radio wave may be received by the BT communication control circuit 21 of the MFP 1, and the BER Of the radio wave received by the BER measuring circuit may be measured. For DCL channels, measurement may be made in the same manner. When the measured BER is less than a threshold level, the communication status of the BT channel or DCL channel to be determined is determined as good, and when the BER is equal to or greater than the threshold level, the communication status of the BT channel or DCL channel can be determined as not-good.

In the respective exemplary embodiments described above, when the communication statuses of the BT channel and DCL channel are determined, the communication statuses are determined independently by using the BT communication control circuit 21a and the DCL communication control circuit 19a, respectively. However, the communication statuses of the respective channels may be determined by using either one of the communication control circuits. In such a case, the processing of operations S11 to S18 of the BT HP table generation processing and operations S31 to S39 of the DCL HP table generation processing may be integrated and performed in together.

In the BT communication processing of the respective exemplary embodiments described above, the case is described in which a good channel is set as the BT channel to be used in the radio communication 400 using BT when the 45 DCL channels used for generating the DCL HP table are all good channels. However, alternatively, a good channel may be set as the BT channel to be used in the radio communication 400 using BT when the number of good channels, among 45 DCL channels used for generating the DCL HP table, is equal to or greater than a third threshold, wherein the value of the third threshold may be configured to be set by a user.

In the respective exemplary embodiments described above, when generating the BT HP table and the DCL HP table, communication statuses of all BT channels and DCL channels are determined. However, communication statuses of parts of the BT channels and DCL channels may be determined and the BT HP table and the DCL HP table may be generated.

In the first exemplary embodiment described above, the case where the value of the channel ratio counter 13e is set depending on whether the communication speed of BT is equal to or greater than the first threshold, is described. However, the communication speed of BT may be divided into a plurality of stages, and corresponding to each stage, the value of the channel ratio counter 13e may be set.

Similarly, in the third exemplary embodiment described above, the case where the value of the channel ratio counter 13e is set depending on whether the time T until unreceived data becomes necessary in the printing processing is equal to or greater than the second threshold, is described. However, the time T may be divided into a plurality of stages, and corresponding to each stage, the value of the channel ratio counter 13e may be set.

According to an exemplary embodiment of the present invention, a radio communication device includes a first radio communicating means which receives data according to a first radio communication method which uses one of a plurality of first radio channels provided in a frequency band and changes the first radio channel to be used with a first period; a data processing means which performs processing by using data received by the first radio communicating means; a first communication status determining means for determining, for each first radio channel, whether the communication status is good in a part or all of the plurality of first radio channels; a ratio changing means which changes a ratio of setting, as the first radio channel to be used in the first radio communication method, a good channel whose communication status is determined as good by the first communication status judging means and a ratio of setting a not-good channel whose communication status is determined as not-good according to a data receiving status of the first radio communicating means and a processing status of the processing in the data processing means; and a setting means for setting either the good channel or the not-good channel as the first radio channel to be used in the first radio communication method according to the ratios changed by the ratio changing means.

In the radio communication device, the radio communication device may include a receiving speed calculating means for calculating a data receiving speed of the first radio communicating means; and a processing speed calculating means for calculating a processing speed of the processing by the data processing means, wherein the ratio changing means increases or decreases the ratio of setting the good channel and the ratio of setting the not-good channel as the first radio channel according to the data receiving speed calculated by the receiving speed calculating means and the processing speed of the processing calculated by the processing speed calculating means.

In the radio communication device, the ratio changing means may increase the ratio of setting the not-good channel as the first radio channel when the data receiving speed calculated by the receiving speed calculating means is equal to or greater than a first threshold determined according to the processing speed of the processing calculated by the processing speed calculating means.

In the radio communication device, the ratio changing means may increase the ratio of setting the good channel as the first radio channel when the data receiving speed calculated by the receiving speed calculating means is less than a first threshold determined according to the processing speed of the processing calculated by the processing speed calculating means.

In the radio communication device, data to be used for the processing by the data processing means may be divided into a plurality of data and received by the first radio communicating means on a divided data basis, the radio communication device may include a number-of-receptions calculating means for calculating the possible number of receptions of another one of the divided data by the first radio communicating means during the processing performed by using one of the divided data, and the ratio changing means may increase or decrease a ratio of setting the good channel and a ratio of setting the not-good channel as the first radio channel according to the number calculated by the number-of-receptions calculating means.

In the radio communication device, the radio communication device may include a time calculating means for calculating a time at which data unreceived by the first radio communicating means becomes needed in the processing performed by the data processing means, wherein the ratio changing means increases or decreases the ratio of setting the good channel and the ratio of setting the not-good channel as the first radio channel according to the time calculated by the time calculating means.

In the radio communication device, the ratio changing means may increase the ratio of setting the not-good channel as the first radio channel when the time calculated by the time calculating means is equal to or greater than a second threshold.

In the radio communication device, the ratio changing means may increase the ratio of setting the good channel as the first radio channel when the time calculated by the time calculating means is less than the second threshold.

In the radio communication device, the radio communication device may include a data storing means for storing data received by the first radio communicating means; and a data presence determining means for determining whether data to be used by the processing performed by the data processing means is in the data storing means, wherein the setting means sets the good channel as the first radio channel regardless of ratio changes made by the ratio changing means when the data presence determining means determines that data to be used by the processing is not present in the data storing means.

In the radio communication device, the radio communication device may include a second radio communicating means which makes radio communication according to a second radio communication method which uses one of a plurality of second radio channels provided in a frequency band at least a part of which is the same as the frequency band used by the first radio communicating means, and changes the second radio channel to be used with a second period; and a second radio communication execution determining means for determining whether radio communication is made by the second radio communicating means, wherein the setting means sets the good channel as the first radio channel regardless of ratio changes made by the ratio changing means when the second radio communication execution determining means determines that radio communication is not made by the second radio communicating means.

In the radio communication device, the radio communication device may include a second communication status determining means for determining whether the communication status is good in a part or all of the plurality of second radio channels for each second radio channel; a second radio channel storing means which selects and stores in advance a number of second radio channels to be used in the second radio communication method while selecting second radio channels whose communication statuses are determined as good by the second communication status judging means; and a number-of-good channels determining means for determining whether the number of second radio channels whose communication statuses are determined as good by the second communication status determining means among the second radio channels stored in the second radio channel storing means is equal to or greater than a third threshold, wherein the setting means sets the good channel as the first radio channel regardless of ratio changes made by the ratio changing means when the second radio communication execution determining means determines that radio communication is made by the second radio communicating means and the number-of-good channels determining means determines that the number of second radio channels whose communication statuses are determined as good is equal to or greater than the third threshold.

According to the radio communication device according to exemplary embodiments of the present invention, according to a data receiving status of the first radio communicating means and a processing status of processing in the data processing means, the ratio of setting a good channel or a not-good channel as a first radio channel to be used in the first radio communication method can be increased or decreased adaptively by the ratio changing means. Accordingly, in a state where the data amount to be received is comparatively smaller than the data amount to be used for the processing, by increasing the ratio of setting a good channel as the first radio channel to be used in the first radio communication method, the communication quality of the first radio communication method is improved, so that the data amount to be received can be increased, and errors and delay generated in the processing due to a lack of received data can be reduced. On the other hand, in a state where the data amount to be received is larger than the data amount to be used for the processing, by increasing the ratio of setting a not-good channel as the first radio channel to be used in the first radio communication method, even in an environment involving fewer good channels, radio communication according to the first radio communication method can be reliably made while using fewer good channels and not-good channels. As a result, even in an environment involving channels which cause radio wave interference, there is an effect that influence of the radio wave interference can be reliably reduced.

Additionally, by changing the ratios so that not-good channels are used as much as possible in a range that data can be received securely, other radio communications can be allowed to use good channels. Accordingly, the communication qualities of other radio communications can be improved.

Additionally, according to the data receiving speed calculated by the receiving speed calculating means and the processing speed of the processing calculated by the processing speed calculating means, the ratio of setting a good channel and the ratio of setting a not-good channel as the first radio channel are increased or decreased by the ratio changing means. Accordingly, from the data receiving speed and the processing speed of the processing, a data receiving status and a processing status of the processing can be grasped, and the ratio of setting a good channel and the ratio of setting a not-good channel as the first radio channel can be properly changed. Therefore, based on the data receiving speed and the processing speed of the processing, even in an environment involving channels which cause radio wave interference, there is an effect that influence of the radio wave interference can be reliably reduced.

Additionally, when the data receiving speed calculated by the receiving speed calculating means is equal to or greater than a first threshold determined according to the processing speed of the processing calculated by the processing speed calculating means, the ratio of setting a not-good channel as the first radio channel is increased by the ratio changing means. In such a case, the data receiving speed is high, so that even when the ratio of setting a not-good channel increases, data receiving can be reliably performed. Therefore, even in an environment involving fewer good channels, there is an effect that radio communication according to the first radio communication method can be reliably made while using fewer good channels and not-good channels.

Additionally, when the data receiving speed calculated by the receiving speed calculating means is less than a first threshold determined according to the processing speed of the processing calculated by the processing speed calculating means, the ratio of setting a good channel as the first radio channel is increased by the ratio changing means. Accordingly, the communication quality of the first radio communication method is improved, so that in a state with a low receiving speed, the data amount received without errors can be increased. Accordingly, there is an effect that errors and delay generated in the processing due to a lack of received data can be reduced.

Additionally, the possible number of receptions of another one of the divided data by the first radio communicating means during the processing performed by using one of the divided data is calculated by the number-of-receptions calculating means, and according to the number, the ratio of setting a good channel and the ratio of setting a not-good channel as the first radio channel are increased or decreased by the ratio changing means. Accordingly, when the possible number of receptions of another one data during processing of one data is large, even when the ratio of setting a not-good channel is increased, data receiving can be reliably performed, so that even in an environment involving fewer good channels, radio communication according to the first radio communication method can be reliably made while using fewer good channels and not-good channels. On the other hand, when the possible number of receptions of another one data during processing of one data is small, by increasing the ratio of setting a good channel as the first radio channel, the communication quality of the first radio communication method is improved, so that the data amount to be received without errors can be increased. Therefore, errors and delay generated in the processing due to a lack of received data can be reduced. Thus, according to the possible number of receptions of another one of divided data during processing of one of the divided data, by changing the ratio of setting a good channel and the ratio of setting a not-good channel as the first radio channel to be used in the first radio communication method, even in an environment involving channels which cause radio wave interference, there is an effect that influence of the radio wave interference can be reliably reduced.

Additionally, according to the time calculated by the time calculating means, the ratio of setting a good channel and the ratio of setting a not-good channel as the first radio channel are increased or decreased by the ratio changing means. Accordingly, from the time at which unreceived data becomes necessary in the processing, the data receiving status and the processing status of the processing can be grasped, and the ratio of setting a good channel and the ratio of setting a not-good channel as the first radio channel can be properly changed. Therefore, based on the time at which unreceived data becomes needed in the processing, even in an environment involving channels which cause radio wave interference, there is an effect that influence of the radio wave interference can be reliably reduced.

Additionally, when the time at which unreceived data becomes needed in the processing is equal to or greater than the second threshold, the ratio of setting a not-good channel as the first radio channel is increased by the ratio changing means. In the case, there is a time until unreceived data becomes needed in the processing, so that even when the ratio of setting a not-good channel increases, if the increase is to an extent allowing the data to be received before the image data becomes needed in the processing, the processing can be performed without generating errors and wait. Therefore, even in an environment including fewer good channels, while using fewer good channels and not-good channels, there is an effect that radio communication according to the first radio communication method can be reliably made.

Additionally, when the time at which unreceived data becomes needed in the processing is less than the second threshold, the ratio of setting a good channel as the first radio channel is increased by the ratio changing means. Accordingly, the communication quality of the first radio communication method is improved, so that data needed in the processing can be received quickly, and accordingly, there is an effect that errors and delay generated in the processing due to a lack of received data can be reduced.

Additionally, when the data presence determination means determines that data to be used by the processing is not present in the data storing means, regardless of ratio changes by the ratio changing means, a good channel is set as the first radio channel by the setting means. Therefore, the communication quality of the first radio communication method is improved, so that data needed in the processing can be received quickly. Accordingly, even in an environment involving channels which cause radio wave interference, there is an effect that the wait time in the processing can be shortened.

Additionally, when the second radio communication execution determination means determines that radio communication is not made by the second radio communicating means which uses a frequency band at least a part of which is the same as the frequency band to be used by the first radio communicating means, regardless of ratio changes by the ratio changing means, a good channel is set as the first radio channel by the setting means. Accordingly, while radio communication is not made by the second radio communicating means, a good channel is used in the first radio communication method, and even when the good channel is used, radio wave interference with at least the second radio communication method does not occur, so that there is an effect that data can be reliably received by the first radio communicating means.

Additionally, when the second radio communication execution determining means determines that radio communication is made by the second radio communicating means and the number-of-good channels determining means determines that the number of the second radio channels whose communication statuses are determined as good among the second radio channels stored in the second radio channel storing means is equal to or greater than the third threshold, regardless of ratio changes by the ratio changing means, a good channel is set as the first radio channel by the setting means. Accordingly, data can be reliably received by the first radio communicating means, and the second radio communicating means can also make communication by using many second radio channels whose communication statuses are determined as good, so that there is an effect that high communication quality can be maintained.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A radio communication device comprising:
a first radio communicating unit configured to receive data according to a first radio communication type using one of a plurality of first radio channels provided in a first frequency band and configured to change the first radio channel to be used with a first period;
a data processing unit configured to perform processing using data received by the first radio communicating unit;
a first communication status determining unit configured to determine, for each first radio channel, whether a communication status of the radio channel is good;
a ratio changing unit configured to change a ratio of setting, as the first radio channel to be used in the first radio communication type, a good channel whose communication status is determined as good by the first communication status determining unit, and a ratio of setting a not-good channel whose communication status is determined as not-good, according to a data receiving status of the first radio communicating unit and a processing status of the processing in the data processing unit;
a setting unit configured to set, according to the ratios changed by the ratio changing unit, either the good channel or the not-good channel as the first radio channel to be used for radio communication according to the first radio communication type;
a receiving speed calculating unit configured to calculate a data receiving speed of the first radio communicating unit; and
a processing speed calculating unit configured to calculate a processing speed of processing by the data processing unit,
wherein the ratio changing unit is configured to increase or decrease the ratio of setting the good channel and the ratio of setting the not-good channel as the first radio channel, according to the data receiving speed calculated by the receiving speed calculating unit and the processing speed calculated by the processing speed calculating unit.

2. The radio communication device according to claim 1, wherein the ratio changing unit is configured to increase the ratio of setting the not-good channel as the first radio channel when the data receiving speed is equal to or greater than a threshold which is determined according to the processing speed calculated by the processing speed calculating unit.

3. The radio communication device according to claim 1, wherein the ratio changing unit is configured to increase the ratio of setting the good channel as the first radio channel when the data receiving speed is less than a threshold which is determined according to the processing speed calculated by the processing speed calculating unit.

4. The radio communication device according to claim 1, wherein data to be used for the processing by the data processing unit is configured to be divided into a plurality of data and to be received by the first radio communicating unit on a divided data basis,
wherein the radio communication device further comprises a number-of-receptions calculating unit configured to calculate a possible number of receptions of a future one of the divided data to be received by the first radio communicating unit during the processing performed using one of the divided data, and
wherein the ratio changing unit is configured to increase or decrease a ratio of setting the good channel and a ratio of setting the not-good channel as the first radio channel according to the number calculated by the number-of-receptions calculating unit.

5. The radio communication device according to claim 1, further comprising:
a time calculating unit configured to calculate a time at which data unreceived by the first radio communicating unit becomes needed in the processing performed by the data processing unit,
wherein the ratio changing unit is configured to increase or decrease the ratio of setting the good channel and the ratio of setting the not-good channel as the first radio channel according to the time calculated by the time calculating unit.

6. The radio communication device according to claim 5, wherein the ratio changing unit is configured to increase the ratio of setting the not-good channel as the first radio channel when the time calculated by the time calculating unit is equal to or greater than a threshold.

7. The radio communication device according to claim 5, wherein the ratio changing unit is configured to increase the ratio of setting the good channel as the first radio channel when the time calculated by the time calculating unit is less than a threshold.

8. The radio communication device according to claim 1, further comprising:
a data storing unit configured to store data received by the first radio communicating unit; and
a data presence determining unit configured to determine whether data to be used by the processing performed by the data processing unit is in the data storing unit,
wherein the setting unit is configured to set the good channel as the first radio channel, regardless of ratio changes made by the ratio changing unit, when the data presence determining unit determines that data to be used by the processing is not present in the data storing unit.

9. The radio communication device according to claim 1, further comprising:
a second radio communicating unit configured to implement radio communication according to a second radio communication type using one of a plurality of second radio channels provided in a second frequency band, at least a portion of the second frequency band being the same as the first frequency band used by the first radio communicating unit, and configured to change the second radio channel to be used with a second period; and
a second radio communication execution determining unit configured to determine whether radio communication is made by the second radio communicating unit,
wherein the setting unit is configured to set the good channel as the first radio channel, regardless of ratio changes made by the ratio changing unit, when the second radio communication execution determining unit determines that radio communication is not made by the second radio communicating unit.

10. The radio communication device according to claim 9, further comprising:
a second communication status determining unit configured to determine whether the communication status is good in a portion of or all of the plurality of second radio channels;
a second radio channel storing unit configured to select and store a number of second radio channels to be used in the second radio communication type while selecting second radio channels whose communication statuses are determined as good by the second communication status determining unit; and
a number-of-good channels determining unit configured to determine whether the number of second radio channels, among the second radio channels stored in the second radio channel storing unit, whose communication statuses are determined as good by the second communication status determining unit is equal to or greater than a threshold, wherein the setting unit is configured to set the good channel as the first radio channel, regardless of ratio changes made by the ratio changing unit, when the second radio communication execution determining unit determines that radio communication is made by the second radio communicating unit and the number-of-good channels determining unit determines that the number of second radio channels whose communication statuses are determined as good is equal to or greater than the threshold.

* * * * *